United States Patent
Chen et al.

(10) Patent No.: US 8,443,035 B2
(45) Date of Patent: May 14, 2013

(54) SYSTEM AND METHOD FOR COLLABORATION USING WEB BROWSERS

(75) Inventors: Shuang Chen, Somers, NY (US); Charles P. Pace, North Chittenden, VT (US); William B. Rubin, Poughkeepsie, NY (US)

(73) Assignee: OP40 Holding, Inc., Somers, NY (US)

( * ) Notice: Subject to any disclaimer, the term of this patent is extended or adjusted under 35 U.S.C. 154(b) by 1413 days.

(21) Appl. No.: 09/947,149

(22) Filed: Sep. 4, 2001

(65) Prior Publication Data

US 2004/0133639 A1    Jul. 8, 2004

Related U.S. Application Data

(60) Provisional application No. 60/229,685, filed on Sep. 1, 2000, provisional application No. 60/236,864, filed on Sep. 29, 2000, provisional application No. 60/237,179, filed on Oct. 2, 2000, provisional application No. 60/254,377, filed on Dec. 8, 2000, provisional application No. 60/262,288, filed on Jan. 17, 2001.

(51) Int. Cl.
*G06F 15/16* (2006.01)

(52) U.S. Cl.
USPC ........... 709/203; 709/204; 707/755; 707/756; 707/778; 715/200

(58) Field of Classification Search ........... 709/201, 709/202, 203, 204, 227, 228; 707/755, 756, 707/77, 809, 802, 203, 791, 793; 715/200
See application file for complete search history.

(56) References Cited

U.S. PATENT DOCUMENTS

| | | | | |
|---|---|---|---|---|
| 5,491,795 | A * | 2/1996 | Beaudet et al. | 715/804 |
| 6,151,622 | A * | 11/2000 | Fraenkel et al. | 709/205 |
| 6,188,401 | B1 * | 2/2001 | Peyer | 715/805 |
| 6,230,171 | B1 * | 5/2001 | Pacifici et al. | 715/201 |
| 6,240,444 | B1 * | 5/2001 | Fin et al. | 709/205 |
| 6,334,141 | B1 * | 12/2001 | Varma et al. | 709/205 |
| 6,407,754 | B1 * | 6/2002 | Hetherington et al. | 715/765 |
| 6,418,448 | B1 * | 7/2002 | Sarkar | 1/1 |
| 6,542,845 | B1 * | 4/2003 | Grucci et al. | 702/122 |
| 6,611,498 | B1 * | 8/2003 | Baker et al. | 370/252 |
| 6,728,756 | B1 * | 4/2004 | Ohkado | 709/205 |
| 6,772,410 | B1 * | 8/2004 | Komatsu et al. | 717/124 |
| 6,898,642 | B2 * | 5/2005 | Chafle et al. | 709/248 |
| 6,968,535 | B2 * | 11/2005 | Stelting et al. | 717/104 |
| 7,003,550 | B1 * | 2/2006 | Cleasby et al. | 709/205 |
| 2002/0054587 | A1 * | 5/2002 | Baker et al. | 370/352 |

* cited by examiner

*Primary Examiner* — Dhairya A Patel
(74) *Attorney, Agent, or Firm* — Benjamin Aaron Adler

(57) ABSTRACT

One or more collaboration computers connected over the network may collaborate using their web browsers. Each collaboration computer may have one or more window locators that uniquely identify a web browser window on the browser. The web browser window can be a window where one or more events occur during the collaboration. One or more document locators may be derived from information describing a document path from the respective web browser window to a document within the respective web browser window. The document path can be a path in a hierarchical structure that includes the document and the respective web browser window. One or more transfer data structures may contain the window locator and the document locator and may be passed to and from the collaboration computer through a network connection to enable a collaboration session.

40 Claims, 20 Drawing Sheets

Collaboration System Configuration

Collaboration System Configuration

Window Locator and Document Path

DOM/DHTML Structure in a web browser

340

| Element tagName and index 341 | Mutant web page hash value 342 |

Element Locator, showing optional mutant web page support

FIG. 2C

Transfer Data Structure (TDS)

Collaboration System Flow

Computing Locators and Writing into TDS

Computing References

Compute Document Locator from Document Reference

Attempt to Get Parent's framesCollection

Append Next Index

Compute Window at Index in IE5 FramesCollection

Compute Document
Reference from Document Locator

Compute Element Reference from Element Locator

Compute Element Locator from Element Reference

Virtual Document Stack

SYSTEM AND METHOD FOR COLLABORATION USING WEB BROWSERS

RELATED APPLICATIONS

This application claims the benefit of priority afforded by U.S. Provisional Patent Application Ser. No. 60/229,685, filed Sept. 1, 2000, the disclosure of which is Incorporated herein.

RELATED REFERENCES

Priority is also claimed for the following documents for any matter not disclosed in provisional U.S. Patent Application Ser. No. 60/229,685 incorporated by reference above. The following references are related to this patent application and are herein incorporated by reference in their entirety:

provisional U.S. Patent Application Ser. No. 60/236,864, entitled "Distributed Internet Server" to Pace et al., filed Sep. 29, 2000;

provisional U.S. Patent Application Ser. No. 60/237,179, entitled "Business Plan and Business Plan Executive Summary" to Chen et al., filed Oct. 2, 2000;

provisional U.S. Patent Application Ser. No. 60/254,377, entitled "Distributed Internet Services provisional filing II" to Pace et al., filed Dec. 8, 2000;

provisional U.S. Patent Application Ser. No. 60/262,288, entitled "Data Structure, Architecture, Apparatus, and Program Product Capable of Being Distributed to and Executed on Different Network Tiers and on Various Computer Platforms and Environment" to Pace et al., filed Jan. 17, 2001;

U.S. patent application Ser. No. 09/947,140, entitled "Extended Environment Data Structure for Distributed Digital Assets Over Multi-tiered Computer Networks", to Pace et al., filed Sep. 4, 2001;

U.S. patent application Ser. No. 09/946,410, entitled "Server System and Method for Discovering Digital Assets in Enterprise Information Systems", to Bobick et al., filed Sep. 4, 2001;

U.S. patent application Ser. No. 09/947,122, entitled "Server System and Method for Exporting Digital Assets in Enterprise Information Systems", to Pace et al., filed Sep. 4, 2001;

U.S. patent application Ser. No. 09/947,096, entitled "System and Method for Transactional Deployment J2EE Web Components, Enterprise Java Bean Components, and Application Data over Multi-tiered Computer Networks", to Pace et al., filed on Sep. 4, 2001;

U.S. patent application Ser. No. 09/946,980, entitled "Server System and Method for Distributing and Scheduling Modules to be Executed on Different Tiers of a Network", to Pace et al., filed Sep 4, 2001;

U.S patent application Ser. No. 09/946,699, entitled "System and Method for Distributing Assets to Multi-Tiered Network Nodes, to Pizzorni et al. filed on Sept. 4, 2001;

U.S. patent application Ser. No. 09/946,438, entitled "Method and System for Deploying An Asset Over a Multi-Tiered Network", to Pace et al. filed on Sep. 4, 2001;

U.S. patent application Ser. No. 09/947,161, entitled "System and Method for Translating an Asset for Distribution Over Multi-Tiered Networks (Processing)" to Pace et al. filed on Sep. 4, 2001;

U.S. patent application Ser. No. 09/947,163, entitled "System and Method for Synchronizing Assets on Multi-Tiered Networks, to Pace et al. filed on Sep. 4, 2001;

U.S. patent application Ser. No. 09/947,016, entitled "Method and System for Deploying an Asset Over a Multi-Tiered Network"' to Pace et al. filed on Sep. 4, 2001;

U.S. patent application Ser. No. 09/947,095, entitled "System and Method for Adjusting the Distribution of an Asset Over a Multi-Tiered Network", to Pace et al. filed on Sep. 4, 2001;

U.S. patent application No. 09/947,119, entitled "System and Method for Bridging Assets to Network Nodes on Multi-Tiered Networks", to Pace et al. filed on Sep. 4, 2001;

U.S. patent application Ser. No. 09/947,141, entitled "Method and System for Deploying an Asset Over a Multi-Tiered Network", to Pace et al. filed on Sep. 4, 2001, describing asset streaming;

U.S. patent application Ser. No. 09/947,162, entitled "System, Method, and Data Structure for Packaging Assets for Processing and Distribution on Multi-Tiered Networks", to Bobick et al. filed on Sep. 4, 2001;

U.S. patent application Ser. No. 09/947,148, entitled System and Method for Transactional and Fault-Tolerant Distribution of Digital Assets Over Multi-Tiered Computer Networks, to Bobick et al. filed on Sep. 4, 2001;

PCT Patent Application No. PCT/US2001/027232, entitled "System and Method for Collaboration Using Web Browsers", to Chen et al. filed on Aug. 31, 2001;

PCT Patent Application No. PCT/US2001/027289, entitled "System, Method, Uses, Products, Program Products, and Business Methods for Distributed Internet and Distributed Network Services", to Chen et al. filed on Aug. 31, 2001.

FIELD OF THE INVENTION

The present invention relates elate s to real time collaboration over computer networks. More specifically, the present invention relates to networking collaboration processes using web browsers.

BACKGROUND INFORMATION

It is believed that many computers are interconnected with other computers through network connections that support Internet Protocol (IP). Further, it is believed that some communications applications use Transmission Control Protocol (TCP), which uses IP. The HyperText Transfer Protocol (HTTP) may use TCP to support the World Wide Web (WWW, or Web). Web pages are files organized using a HyperText Markup Language (HTML) or extended Markup Language (XML). A web browser may be a client graphical user interface (GUI) application that navigates among web pages containing hypertext links.

Real-time collaboration over computer networks, such as the Internet, corporate intranets, etc.; may involve two or more clients on the network that are participating in the collaboration session seeing the same view, e.g., of the web pages. Some collaboration further includes end user input on the web page. Real-time collaboration is described as "What You See Is What I See" (WYSIWIS). Examples of real-time collaboration include: chat, text editor collaboration, web browser collaboration, and various other application program collaborations like collaborative drawing.

Regarding web browser collaboration, it is believed that many systems attempt to work with the same web pages that are used in non-collaborative work—not with specially-modified "collaboration-aware" web pages. Collaboration-aware web pages are available.

Some web browser collaborative systems share only navigation. That is, collaborating clients see the same web page, but do not share other aspects of collaboration. For example, see Groove 1.0, by Groove Networks, www.groove.net or www.groovenetworks.com. Some collaboration systems share not only navigation, but also document scrolling. For example see eMeeting™ 3.0, by Centra, www.centra.com. A few collaboration systems support full WYSIWIS collaboration including navigation, scrolling, and all user inputs. See "Collaborative Customer Services Using Synchronous Web Browser Sharing", by Makoto Kobayashi, Masahide Shinozaki, Takashi Sakairi, Maroun Touma, Shahrokh Daijavad, and Catherine Wolf, Proceedings of the ACM 1998 Conference on Computer Supported Cooperative Work, Nov. 14, 1998, which is herein incorporated by reference in its entirety. Further, the reference "Programming Microsoft Internet Explorer 5", by Scott Roberts, Microsoft Press, 1999, which is herein incorporated by reference in its entirety, discusses Internet Explorer internals.

Some collaborative systems achieve WYSIWIS operation by executing only one copy of the application on one client, and replicating its graphical output on the other clients. This technique requires large amounts of data transfer among collaborating clients, requiring expensive, high-bandwidth connections. Some more advanced systems exploit particular operating system features such as Microsoft Windows™ Dynamic Data Exchange (DDE). See U.S. Pat. No. 6,240,444 B1 to Fin et al., herein incorporated by reference in its entirety.

It is believed that much of the available devices concerning collaboration may operate only with a specific browser for which the collaboration process is designed. For example, a collaboration session using Microsoft's Internet Explorer™ browser (IE) on one client may only collaborate with other clients that use IE. Thus, it is believed that this system cannot create collaboration sessions on clients that have non-compatible browsers.

Much of the prior art uses screen positions to locate windows on collaborating clients graphical user interfaces (GUIs). The client systems in these collaboration sessions should translate this information before the information is used on the collaborating client. However, this class of collaboration system is believed to have problems with window sizing and often has problems with locating windows in the collaboration session.

Some prior art systems do not work accurately with "mutant web pages" in a collaboration session. A mutant web page is a web page that changes so that different clients downloading the "same" web page will get slightly different versions of the web page. These versions have different rendering characteristics so each client sees a somewhat different rendering of the same page. Some examples of mutant web pages include web pages with "banner ads" that can be randomly generated by the server.

SUMMARY

An exemplary method and/or embodiment of the present invention is directed to providing an improved real time network collaboration system.

Another exemplary method and/or embodiment of the present invention is directed to providing an improved real time network collaboration system that can operate collaboration sessions independent of a client operating system and/or a client web browser.

Another exemplary method and/or embodiment of the present invention is directed to providing an improved real time network collaboration system that is able to work with web pages on a client in a collaboration session without window sizing and location problems.

Another exemplary method and/or embodiment of the present invention is directed to providing an improved real time network collaboration system that can work with mutant web pages in a collaboration session.

Another exemplary method and/or embodiment of the present invention is directed to providing a system, method, and program product for collaborating over a computer network. One or more collaboration computers may be connected over the network collaborate using their web browsers. Each collaboration computer may have one or more window locators that uniquely identify a web browser window on the computer. In the web browser window one or more events may occur during the collaboration. One or more document locators may be derived from information describing a document path from the respective web browser window to a document within the respective web browser window. The document path is a path in a hierarchical structure that includes the document and the respective web browser window. One or more transfer data structures may contain the window locator and the document locator and may be communicated to and from the collaboration computer through a network connection to enable a collaboration session with one or more other collaboration computers.

In another exemplary embodiment, the hierarchical structure may be a document object model (DOM) located on the browser or a Dynamic Hypertext Markup Language (DHTML) model. In other exemplary embodiments, the transfer data structure may contain an element locator that uniquely defines an element within the document.

DETAILED DESCRIPTION

Figure 1:
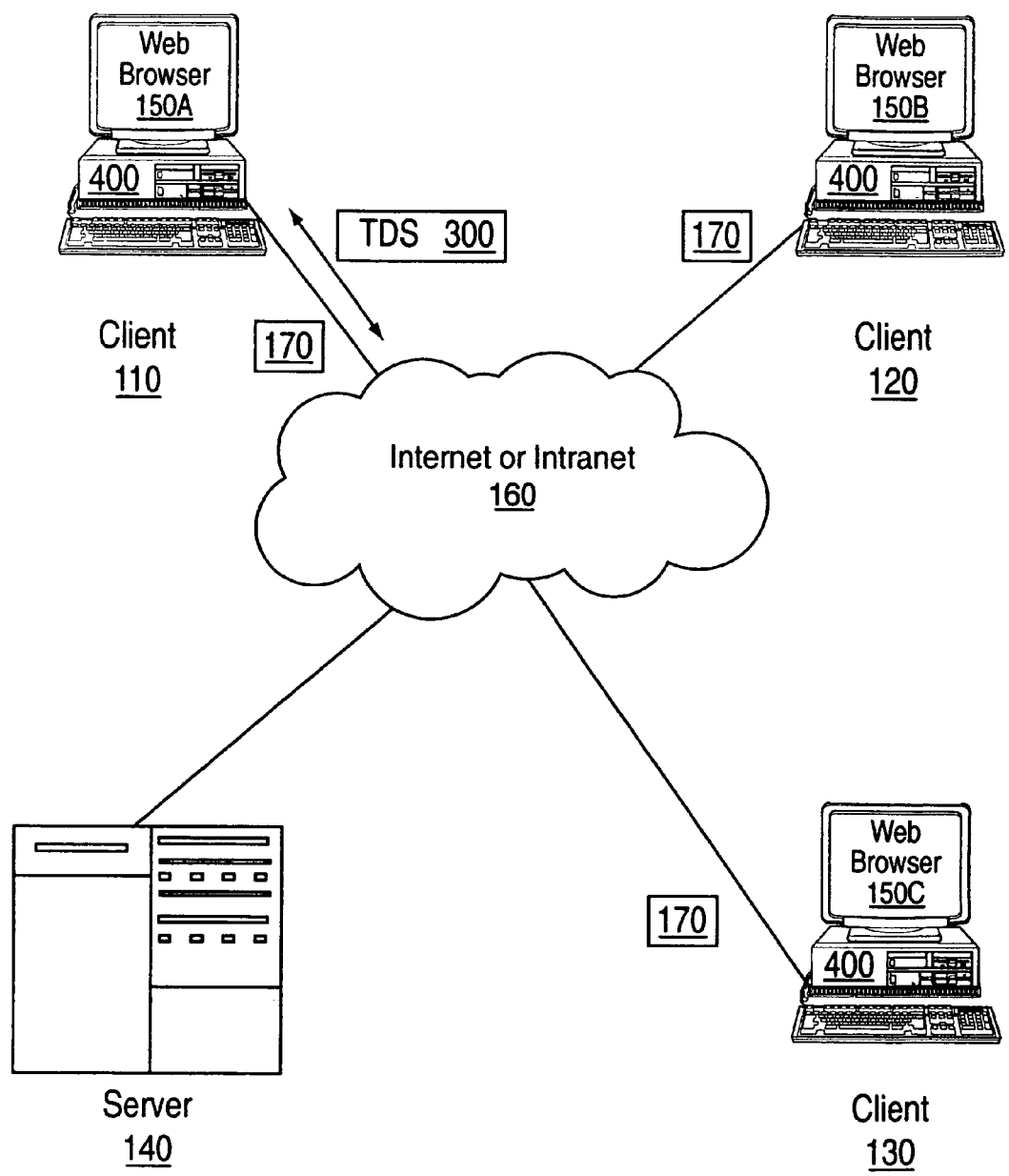
FIG. 1 shows an exemplary diagram of the collaboration system configuration with several collaboration computers.

A data structure may also be an asset. The asset has two basic layers: the first layer is the Logic/Data (LD) layer and the second layer is the Extended Environment (EE) layer which supports the Logic/Data layer. The Logic/Data layer comprises any general type of program (algorithmic logic) and/or data that has some purpose. More specifically, the Logic/Data layer embodiments can include: systems, applications, modules, functions, variables, and data in any language. Even more specifically, the Logic/Data layer in an object-oriented language can include: components, classes, methods, and data members. More specifically, in the Java programming language the Logic/Data layer can include: java archive files (JARs), Java packages, and Java classes. More specifically, in Java Enterprise Edition Application Programming Interfaces (APIs) have Logic/Data layer that can include: Java Server Pages (JSPs), Java Servlets, and Enterprise Java Beans (EJBs). Data can include any type of data structure including that data stored in a relational database, an object-oriented database, hierarchical database, and/or flat file. The Logic/Data layer can also be any combination of these things. Preferably, the Logic/Data layer is a subset of one or more EIS.

The extended environment layer is also a subset of the respective EIS but includes those portions of the EIS that are necessary to support a respective Logic/Data layer. The content of the extended environment layer therefore depends on what the respective Logic/Data layer is. Support of the respective Logic/Data layer enables the respective Logic/Data layer to perform its purpose in a different environment and/or on a different platform. That is, the support provided by the EE layer is that part of the source or EIS system that is necessary for the respective LD layer to perform its function. For example, if the Logic/Data layer is an EJB, the extended environment layer comprises the proxy stubs and skeletons, deployment descriptor, and JNDI entries associated with the respective EJB. If the Logic/Data layer is data, the extended environment layer comprises a table schema etc.

There may be an asset interface layer (AI) between the EE layer and the base environment layer (BE) below. The AI enables the passing of information, if required, between the EE and the BE. For the purposes of this disclosure, one preferred structure of an asset includes the LD, the EE, and, where applicable, the AI. The base environment layer is not part of the asset, but is used to enable the asset in one or more environment and/or platforms other than those on the EIS (source system). The base environment might include web, middleware, and/or database services. More specifically, in some embodiments, the base environment layer provides a http server, a servlet engine, an EJB container, and/or relational database management system (RDBMS). In a preferred embodiment, the base environment layer needs to be known so that the class of asset can be provided with an appropriate set of services.

An asset also can be defined as some meaningful partitioning (logic/data layer) of an application combined with part of the source environment (the extended environment layer) that is needed to run that partition of the application. Each asset has an asset type that uniquely identifies that class of asset. In this way, assets can be correlated with the proper asset adapter(s) as the move across tiers of the network over the lifecycle of the asset. An asset adapter is a logical designation for a set of functionality that enables the asset to progress through the asset lifecycle. The asset lifecycle is a set of operations that transform the asset as it moves from source (e.g. one or more EIS) to distribution server to target (e.g. one or more clients/nodes).

A single asset contains all the elements necessary to package, move, transport, and restore an asset to its original state (in its source location) while moving the asset from the source location to the target location using a Distributed Internet Services (DIS) system. Thus an asset is able to maintain its relationship with other functions and those things required for it to perform its functions across different environments or platforms. Preferably, the asset has the minimal application logic, execution/transaction/security context, and state required to perform the purpose of the asset at one or more targets. An asset has purpose in one environment that can be achieved in one or more other environments by moving a minimal amount of application logic and data.

Discovery is the process of determining asset dependencies that result in the definition of a package specification. Versioning is the process of determining the current version of an asset against a cached asset and updating the cached asset if it is out of date. Export is the process of taking the various elements that constitute an asset and packaging those elements into a data structure.

The EIS adapter/agents are able to process any general modules/objects and/or asset (pg. 19, ll. 41). An agent is a process or service that can be assumed to be available in an environment (pg. 51, ll. 16). These agents provide a generalized framework for distributing assets. The types of assets they distribute correspond with the asset adapters that are defined for the system (pg. 51, ll. 25-26). Each agent is responsible for providing a service interface, on a network node, that other agents can access. Those other agents may be on the same node/computer or different nodes/computers on the network.

The asset goes through a lifecycle starting in the source tier, moving through the deployment tier, into the target tier, and then optionally back through the deployment tier to the source tier and/or can move to any other node or nodes in the network if required. The asset adapter methods define the steps in this lifecycle where asset type specific processing is required for the asset to continue through the lifecycle.

In the source tier, resources are discovered using a discovery asset adapter method, to identify candidates for classification as assets and together as packages. A package specification is created that in turn contains asset specifications. The asset specification is stored in the deployment tier until a package is scheduled to be delivered. The version asset adapter method is used to determine the current version information of the assets in the source tier. This version information is compared with the target tier asset version information in the deployment tier to determine if assets need to be deployed from the source tier to the target tier.

The export asset adapter method is used to obtain the actual current version of assets in the source tier that need to be distributed to the target tier. After the assets are exported, the assets are moved to the deployment tier and stored in an asset cache. When exporting assets, the export asset adapter method captures the logic, data, and extended environment information for an asset and puts it into an asset data structure.

If an asset requires processing the processing may be done when the asset is stored in the asset cache or at any time before the asset is distributed to either a secondary cache in the deployment tier or the target tier. The processing is primarily performed on the asset's extended environment, in an attempt to translate the extended environment to run in harmony with the base environment in the target tier.

An agent in the target environment requests the assets that are pending for delivery to that target tier. The target processing asset adapter method is executed against any asset that require targeted processing before being sent to the target tier. Target processing is intended primarily to change the Logic/Data section of the asset data structure in order to provide a unique asset that can create or has personalized information for the target tier in which it is being deployed. The targeting can be for an intermediate target (a server that will in turn server many users) or a final target (a single node that will serve a single user). When the asset is sent to the target tier, the deploy asset adapter method is invoked to deploy the asset into the computational environment in the target tier. The extended environment from the asset's data structure is used to set the base environment and extended environment in the target tier to run the asset in a correct manner. The asset's logic and data are then deployed into the base environment, and since the environment has been adjusted, the logic will function correctly and the data will be accessible. When changes happen in the target tier that warrant synchronization, the synchronization asset adapter method is executed to create a synchronization asset and the asset is propagated back through the deployment tier into the source tier and the source tier resource that corresponds to the synchronization asset is synchronized with that asset Distributed Internet Services refers to a logical architecture of a physical network system comprising one or more networks, preferably, the Internet (or other network) that is connected to one or more EIS tiers, one or more component server tiers, and one or more target/client tiers (of one or more clients) using any well known configuration and communication connections. Each of the EIS tiers, component server tiers, or the client tiers can be further divided into sub-tiers as is done in many well-known network designs. The component server tier, or portions of its functions, may reside on the EIS tier. There can be a plurality of EIS functions that may or may not be connected through the network.

The EIS adapter/agents are able to process any general modules/objects and/or asset. (In some embodiments, the EIS adapter/agents are part of the Component Distribution Server (CDS) tier and are distributed to the respective EIS to perform their functions.) Again, the EIS tier architecture can comprise one or more sub-tiers and/or one or more different EIS's. The EIS tier communicates with the client node tier architecture on the client node tier over network connections by any appropriate protocol. In a preferred embodiment, these protocols include the well-known web protocols, web page protocols, browser/client protocols, network communication protocols, and connection protocols.

The EIS communicates over network connections with one or more CDS tier architectures in the component server tier 860. The communication between the EIS and the CDS tier architecture includes any appropriate protocol that includes CORBA—Common Object Request Broker Architecture; IIOP—Interoperable Internet Object Protocol; RMI—Remote Method Invocation (T3, JRMP—Java Remote Interface Protocol, IIOP). The CDS tier architecture also communicates with the client node tier architecture through network work communication connections using protocols. These protocols include CORBA (IIOP), RMI (T3, JRMP, IIOP), and Multi-platform Communication Connection.

The Component Server Tier architecture comprises one or more component server nodes that may be distributed across two or more sub-tiers. One or more of these component server nodes has a component distribution server process that includes various combinations of CDS agents and adapters. Generally, in one preferred embodiment, the CDS agents/adapters find objects in respective tiers across the network and package these objects for distribution to the clients on the client tier and/or across other tiers of the network. See description below. In one preferred embodiment, the component server node has a collaboration functio, often provided by a collaboration server 970. The collaboration function can be any known collaboration function in the art.

The target tier architecture includes one or more client nodes. The target/client node tier architecture can include many different types of clients including: personal computers, workstations, pervasive devices, local servers (e.g. LAN servers), proxy servers, general network servers, EIS systems, etc. Clients in the target tier include any generally known client architecture. The target tier and client architectures can be distributed throughout the network, can be divided into sub-tiers, and can even include general network servers or EIS systems functioning as a client for a particular function or program module. These client nodes comprise one or more novel client distribution agents or adapters (CDA), in various configurations, that handle the communication between the client node and either the CDS tier, other client/target tiers, and/or one or more EIS tier.

FIG. 1 shows an exemplary diagram of the collaboration system configuration with several collaboration computers. Specifically, FIG. 1 shows an example of a collaboration system 100 configuration in a general computer network 160 such as, but not limited to, the Internet or an intranet 160. Three collaboration clients or collaboration computers 110, 120, and 130 may be connected to network 160 through their respective network interfaces 170. Zero or more available servers 140 are also connected to the network. Servers 140 can also be collaboration servers. The collaboration computers 110, 120, 130 may be any available computing device having one or more central processing units (CPUs), one or more memories, and one or more network connections via their network interfaces 170. The collaboration computers 110 may include any type of computer device that is able to connect to and communicate over a network. Examples of collaboration computer(s) 110 may be any general computer or processor including: personal computers, computer workstations, main frames, network appliances, hand held devices, general pervasive devices, network appliances, personal data assistants (PDAs), etc. The network connection or interface 170 may include any available computer connection to a network including: a digital connection, an electrical connection, an optical connection, and a radio frequency connection.

A collaboration client 110 may be executing a web browser 150A. The present invention enables real-time collaboration among two or more collaboration computers 110, 120, 130 that may or may not have the same kind of web browser 150A, 150B, 150C. For example, one of the clients, e.g., client/collaboration computer 110, may be running a Microsoft Internet Explorer (IE) web browser 150A while another collaboration computer, e.g., client/collaboration computer 120, runs a Netscape Navigator web browser 150B. Web browsers 150A,B may download web pages containing Hypertext Markup Language, HTML or Extended Markup Language, XML, (or any general markup language) from the network.

These pages are rendered by the web browser 150A, B, C on a display device 110 connected to a client computer. Web browsers 150A, B, C and their function are available and include, for example, IE, Netscape Navigator, and Mozilla.

The collaboration sessions among collaboration computers, such as client/collaboration computer 110, can be enabled by the creation and communication of a transfer data structure (TDS) 300. See, for example, FIG. 3.

The TDS 300 may contain information like a window locator 320 that uniquely identifies a browser window 250 in the respective web browser 150A and document information (a document locator 330) that uniquely identifies a document 205 within the browser window 250 by using path information (document path 230).

Figure 3:
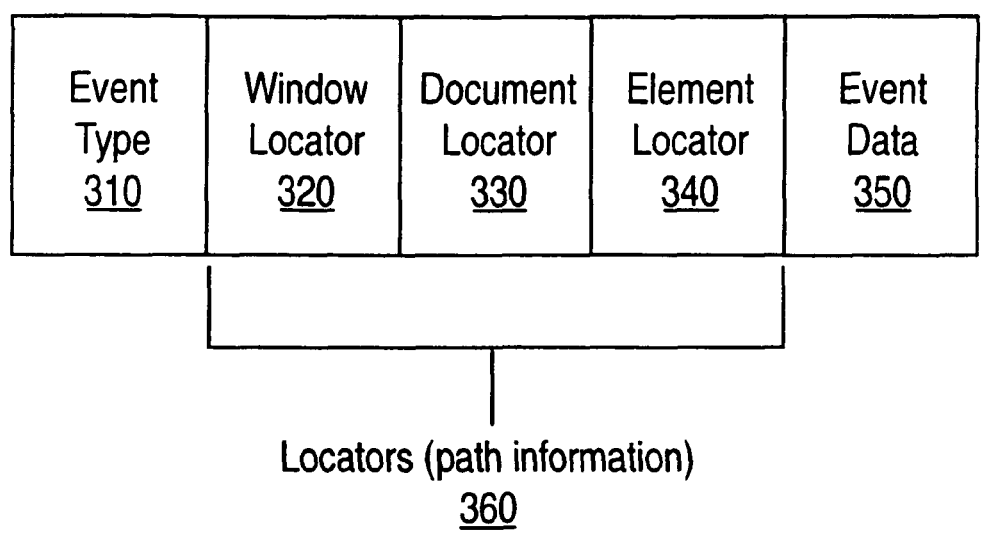
FIG. 3 shows an exemplary block diagram of an exemplary transfer data structure (TDS) used to enable one or more collaboration sessions among collaboration computers in the collaboration system.

Referring to FIG. 3, in an exemplary embodiment, the TDS 300 also may also contain event type 310, element locators 340, and/or event data 350. See, for example, FIG. 3.

Using the TDS 300, a collaboration session can occur among two or more collaboration computers 110 with or without a server 140. In an exemplary embodiment, a server 140 may not be used and the TDS 300 is communicated directly among the collaboration clients 110 in a peer-to-peer communication. In an exemplary embodiment of the present invention, the server 140 is used to pass the TDS 300 among the collaboration computers 110.

Each collaboration computer 110 executes a collaboration process 400. See, for example, FIG. 4.

Thus in a collaboration session, a client/collaboration computer 110 creates a TDS 300 and communicates the TDS 300 to one or more other collaboration computers, for example, collaboration computer(s) 120. The other collaboration computer(s) 120 may use the information within the TDS 300 to determine which document should be operated on, for example, when and/or where an event is applied to, so that both the collaboration computer I 110 and the other collaboration computer(s) 120 may apply the respective event to the document 205 in a correct manner.

Figure 2:
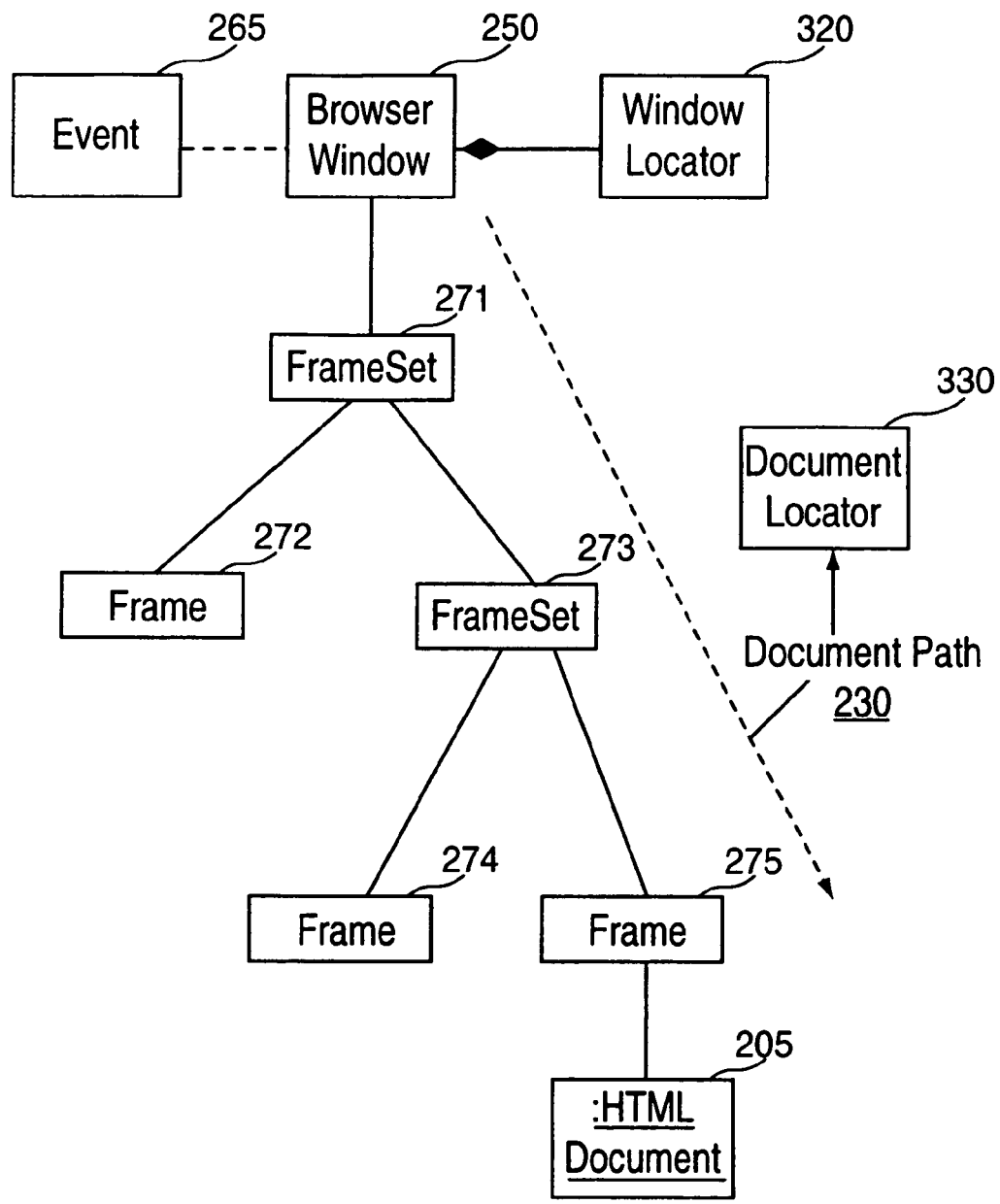
FIG. 2A shows a block diagram of an exemplary hierarchical data structure including a document locator and a document path.
FIG. 2B shows a Unified Modeling Language (UML) diagram of an exemplary hierarchical data structure such as a DOM/DHTML model with an element locator.
FIG. 2C shows a block diagram of an element locator showing optional mutant web page support.

FIG. 2A shows a block diagram of an exemplary hierarchical data structure 290 with a document locator 330 and a document path 230.

The document path 230 is a path within a hierarchical structure 290 that leads from the web browser window 250 to the document 205. The document path 230 may uniquely connect the web browser window 250 and the document 205. One exemplary embodiment of document 205 can only be reached from the web browser window 250 by traversing the document path 230 and no other path. This information in the TDS 300 may be independent of the web browser that is used on any of the collaboration computers 110 in the collaboration session. For example, by using the TDS 300, any computer platform, operating system, and web browser 150 may be used by any of the collaboration computers 110, 120, 130.

The hierarchical data structure 290 may originate from the browser window 250. The browser window 250 is any window that may be used by the web browser 150 on the collaboration computer 110 to render the web page on the collaboration computer 110 display. Browser windows 250 are available and may be defined by the type of web browser on which they are used.

The system may select one or more browser windows 250 called selected browser windows. A browser window 250 may be selected because an event 265 occurred in the respective browser window 250. An event 265 is a web browser 150 construct that is created by the web browser 150 in response to an end user input in the collaboration computer 110. Examples of end user inputs are: key press, mouse click, touching a touch screen, clicking on a tablet, dragging, etc.

Figure 2B:
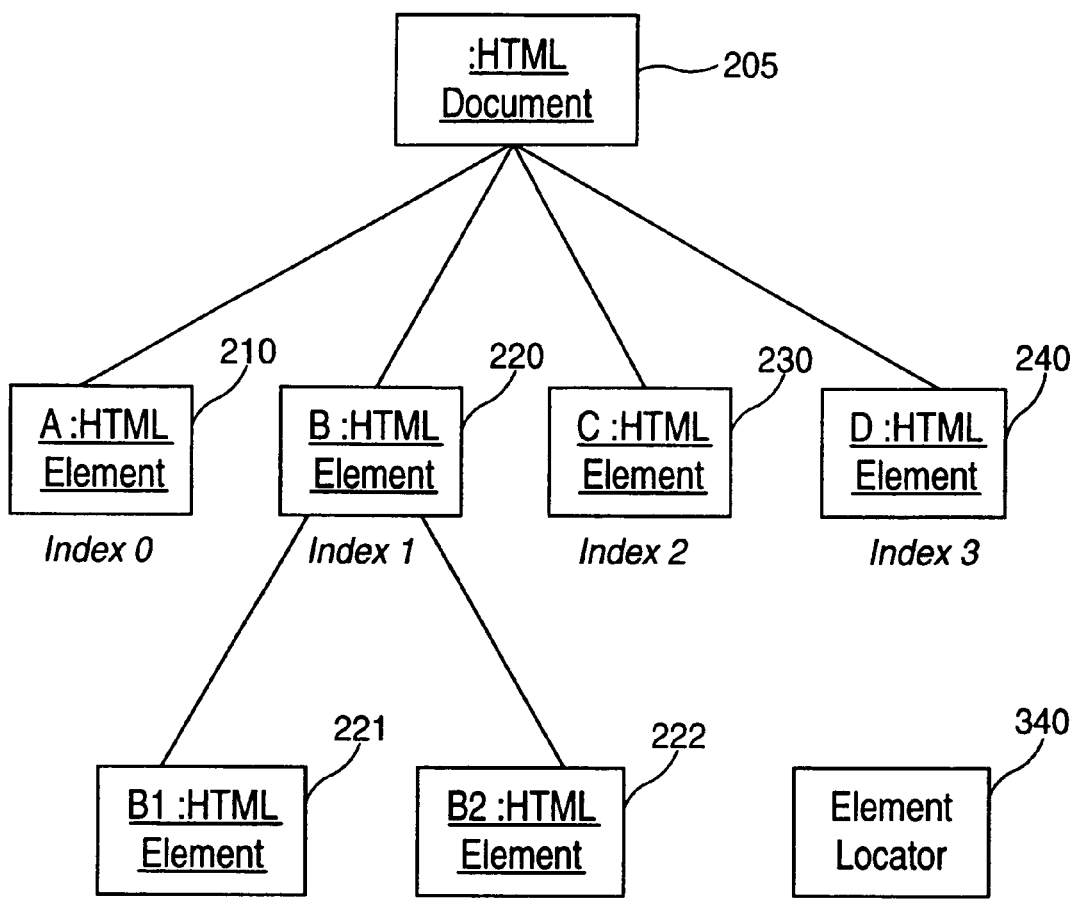

Events 265 may occur on a document 205 or on a document 205 and an element (210, 220, 230, or 240, referring to FIG. 2B). When the event 265 occurs on a document 205, the respective web browser 150 and/or operating system may identify the selected browser window 250 and the document 205. In other cases, when the event 265 occurs on an element 210, the respective web browser 150 and/or operating system may identify the selected browser window, the selected document 205, and element 210. An exemplary embodiment of the present invention may be directed to converting this browser/operating system identification into "locators" (window locator 320, document locator 330, and element locator 340) that are independent of the browser type, operating system, process, and machine.

For example, the end-user may perform scrolling on a document in a web page in a browser window. The web browser 150 generates a scroll event 265, available to the browser 150. The scroll event 265 may identify the scrolled document 205 along with the selected browser window in which the scrolled document 205 is contained. Information from the scroll event 265 may be used to create the TDS 300 in FIG. 3. See also, for example, FIG. 5. The event information includes the event type 310, locators (not including an element locator 340) 320, 360, and event data 350 (how far the end user has scrolled).

In another exemplary embodiment and/or method, the end-user may perform a mouse-click on a checkbox in a document in a web page in a browser window 250. In this case, the checkbox is an element 210 of a document 205 in the browser window 250. The web browser 150 causes a mouse-click event, known to the web browser 150A, 150B, 150C, to be generated in the browser window. Information from the event 265 can be used to create the TDS 300 in FIG. 3. See also, for example, FIG. 5. In FIG. 3, the event information may include the event type 310, window locator 320, and event data 350.

A window locator 320 is process-independent, machine-independent, and browser-type independent data structure that may describe a selected browser window 250. In an exemplary embodiment, the window locator 320 may be an index indicating the chronological order of creation of the browser window on the respective machine. For example, using a "zero" index origin, a window locator 320 containing a "4" may correspond to a window created on the machine in a particular session. In another exemplary embodiment, the window locator 320 may be a character string naming the browser window 250. For example, the window locator 320 containing the string "Gertrude" may correspond to a window named "Gertrude" created in a particular session.

Having uniquely identified and selected a browser window (250S), an exemplary method and/or embodiment of the present invention may also allow for selecting a hierarchical structure 290 that may be associated with a selected browser window 250. In another exemplary embodiment, the associated hierarchical structure is the set of frames 271 through 275 that may be organized in the hierarchy 290 with the selected browser window 250S leading to its root. That is, the hierarchy 290 may be the set of browser specific constructs, e.g., frames 271, that are associated with the current web page being rendered in the browser window 250.

A set of frames or frame set 271 may be made of one or more frames or framesets, e.g., 272 and 273, within the hierarchy 290. Frames 275 can contain documents 205. These documents 205 may be HTML documents. However, other documents 205 include XML.

Documents 205 may contain text, images, etc. Documents may also contain input elements like check boxes, hyperlinks, buttons, input fields, etc.

A frameset, e.g., 271, is a set of frames and/or framesets, ordered in the same way in which they are rendered by the browser 150A, 150B, 150C. Frames, framesets, and their ordering are available.

Given the hierarchy 290, a unique path 230 can be defined through the hierarchy 290 from a selected browser window 250/250S to the frame 275 of the document 205. Both the document 205 and a selected browser window 250 are identified by the event 265. While paths 230 through hierarchies 290 are available, exemplary methods and/or embodiments of the present invention may use a path 230 to provide information about the relationship of the selected browser window 250S to the document 205 for collaboration.

A document locator 330 may be a sequence or vector of indices that describes the path from the browser window, for example, the selected browser window 250S, to a given document 205, for example, the selected document. In another exemplary embodiment and/or exemplary method, each index is the "off-set" of a child frame or frameset from its parent frame set. For example, path 230 could be defined as (1,1) where the first "1" is the path from frameset 271 to frameset 273 (where the "0" path would be from frame set 271 to 272) and the second "1" is the path from frameset 273 to frame 275 (where the "0" path here is the path from frameset 273 to frame 274).

In an exemplary embodiment, the browser 150 may use an industry standard hierarchy 290 called a Document Object Model (DOM). In another exemplary embodiment and/or method, the browser 150 may use a Microsoft™ standard hierarchy called a DHTML.

An exemplary DOM is defined by the World Wide Web Consortium (W3C) DOM Level 2 specification. See, for example, http://www.w3.org/DOM/.

First generation web browsers did not expose the internals of their user interfaces. Second generation web browsers exposed the user interface components in an operating system-dependent manner. Third generation web browsers are beginning to expose the user interface components in an industry-standard manner, using the Document Object Model (DOM). Until recently, collaboration technology has not had this standardized interface for web browser interaction. However, the DOM does not lend itself easily to collaborative applications. The DOM tends to be several levels of indirection away from the user interface.

FIG. 2B is a Unified Modeling Language (UML) diagram 200 of an example hierarchical data structure, e.g., a DOM/DHTML model with an element locator 340. The object diagram 200 shows part of the internal representation of an HTML (or XML) document 205 inside a web page displayed by a web browser 150 of any type. As a nonlimiting example, the HTML (or XML) document 205 contains four HTML (or XML) elements 210, 220, 230, and 240, typically 210. Examples of the elements 210 may include input text field, button, input check box, script, Java script, and input radio button.

The HTML document 205 and each HTML element 210, 220, 230, and 240 may be identified internally by the web browser in terms of a virtual address, also available as a memory address, pointer, or reference. Such identification will herein be called a reference. Thus, the HTML document 200 is identified by a document reference, for example 205R, and an HTML element 210 is identified by an element reference, for example 210R. The reference for the respective element is designated by adding an "R" to the reference number of the element, for example 210. For example, the element 230 may have an element reference 230R. In addition, any general document 205 may have a document reference 205R. A reference may be meaningful only within the process containing it, i.e., it is process dependent/specific.

One can traverse the HTML Elements 210, 220, 230, and 240 of an HTML document 200 by getting the all collection of the document, which contains references to all the elements in the order of the HTML tags. The elements can be retrieved by index. For example, the A: HTMLElement 210 reference is returned at index value 0, the B: HTMLElement 220 reference 220R is returned at index value 1, etc. These index values are examples of "element locators" 340 and can be used to identify DOM objects across processes and across machines. Thus, B: HTML Element 220 can be identified by an element locator 340 comprising an index whose value is 1. Unlike the references, the index values may be process independent.

However, all-collection index values are not necessary browser-type independent. The all-collection for one browser-type may not provide the element references 210R, from which the index values are obtained, in the same order as does the all-collection for another browser-type.

In another exemplary embodiment of the present invention, the all-collection feature is not used. Instead, a feature specific to element type may be used to produce the index values grouped by element type.

Some HTML Elements contain sub-elements. For example, if 220 is a Select Box element, it may contain Select Elements, e.g., sub-element buttons 221 and 222.

FIG. 2C is a block diagram of an element locator 340 showing optional mutant web page support. The element locator 340 contains an element tagName and index 341 and a mutant web page hash value 342.

As described above, field 341 contains the index describing the respective element. In alternative embodiments, e.g., to address browser-type independence, an element type descriptor, e.g., tag name 341, may also be provided.

In exemplary embodiments that are required to process mutant web pages, a mutant web page value 342 may also be provided in the element locator 340. The mutant web page value 342 may be a description of the element that remains constant even when other parts of the web page change, or when end user inputs occur. In another exemplary embodiment, one or more attributes of the element are concatenated into an identification string (see FIGS. 12 and 13) that is then hashed to produce a hash value that is stored in field 342. (Hashing may be available). Attributes may be selected that do not vary in the collaboration environment. In another exemplary embodiment, such attributes can include the ID attribute and/or the NAME attribute of the element (HTML object) and/or its "neighborhood" (nearby elements) on the web page. Delimiters may be written between the fields of the string to avoid certain ambiguous descriptions.

FIG. 3 shows a block diagram of an exemplary transfer data structure (TDS) 300 used to enable one or more collaboration sessions among collaboration computers 110 in the collaboration system 100. The fields in a transfer data structure (TDS) 300 may be used to synchronize collaborating clients 110, 120, and/or 130, etc. The TDS 300 may consist of an event type 310 and a WindowLocator 320, assuming the client may have more than one web browser window 205. If the event 265 is in a document 205 or element 210 (rather than just a window 250), the TDS contains a document locator 330, because a web browser window 250 may contain more than one document 205, when frames 271 are considered. If the event 265 is in an element 210 (rather than just a document 205), the TDS 300 contains an element locator 340. If the event 265 requires any data to completely describe it, the TDS contains event data 350. Event data 350 may be present even if there is no Element Locator 340 or Document Locator 330.

All the data in the TDS 300 is process-independent, machine-independent, and browser-type-independent.

Non-limiting examples of the event type 310 may include any one or more of the following: a window event type, a document event type, an element event type, a move, a mouse move, a resize, a maximize, a minimize, a restore, a focus, an unfocus, a close, a scroll, a keystroke in a text area, a keystroke in an input text field, a mouse click in an input, a button press, a checkbox select, a radio button press/selection, a mouse click on an anchor, a select on a single-select box, a select on a multiple-select box, a scroll on a textarea, a computer input, a touch on a touch screen, a click on a tablet, a drag, and a scroll on a select box.

The Event Type 310 can represent a document scroll, in which case the Locators 360 describe a document, and the Event Data 350 contains the horizontal and vertical scroll positions.

The Event Type 310 can represent a mouse click, in which case there is no event data 350, and the Locators 360 describe the element upon which the mouse click occurred.

The Event Type 310 can represent a text change, in which case the Locators 360 may describe the input text field, input password field, or textarea element in which the text change event occurred, and the Event Data 350 contains the new text, or the change to the text. A text change event may occur because of a keypress, or select followed by delete key, or optional select followed by paste into from the clipboard.

The Event Type 310 may represent a single select, in which case the Locators 360 describe a select box allowing only single select, and the Event Data 350 contains the index of the selected <option>.

The Event Type 310 may represent a multiple select, in which case the Locators 360 describe a select box allowing multiple select, and the Event Data 350 describes the new set of selections, or alternately, the change in the set of selections. One way to describe the new set of selections is with a Boolean vector.

The Event Type 310 can represent an element scroll, in which case the locators 360 describe a textarea or select box, and the Event Data 350 may contain the horizontal and/or vertical scroll positions.

The event type 310 may also include one or more interactions with a browser plug-in. This interaction with a browser plug-in can include: a window event type, a document event type, an element event type, a move, a resize, a maximize, a minimizes a restore, a focus, an unfocus, a close, a scroll, a keystroke in a text area, a keystroke in an input text field, a mouse click in an input, a button press, a checkbox select, a radio button press, a mouse click on an anchor, a select on a single-select box, a select on a multiple-select box, a scroll on a textarea, a computer input, a touch on a touch screen, a click on a tablet, a drag, and a scroll on a select box.

The event type 310 may also include one or more interactions with an applet hosted in a browser. In another exemplary embodiment, the applet hosted in a browser is a Java applet. Additional interaction could conform to the Java AWT and JFC standards of user interface interaction.

The event type 310 may also include interaction with a Java application. Nonlimiting examples of the Java application may include interaction conforming to the Java 10 AWT and JFC standards of user interface interaction. Event types for various browsers 150 may be varied and available.

Non-limiting examples of event data entries in the event data field 350 may include any one or more of the following: a horizontal scroll position, a vertical scroll position, a scroll offset, a new value, a new string, a new text, a change of text, a select option, a set of select options, a move position, a horizontal move position, a vertical move position, a horizontal window resize value, and a vertical window resize value. In another exemplary embodiment, the event data entry may transform the scroll data into percentage based scrolls that allow for different display devices to render the correct scroll position for collaborating computer systems.

Figure 4:
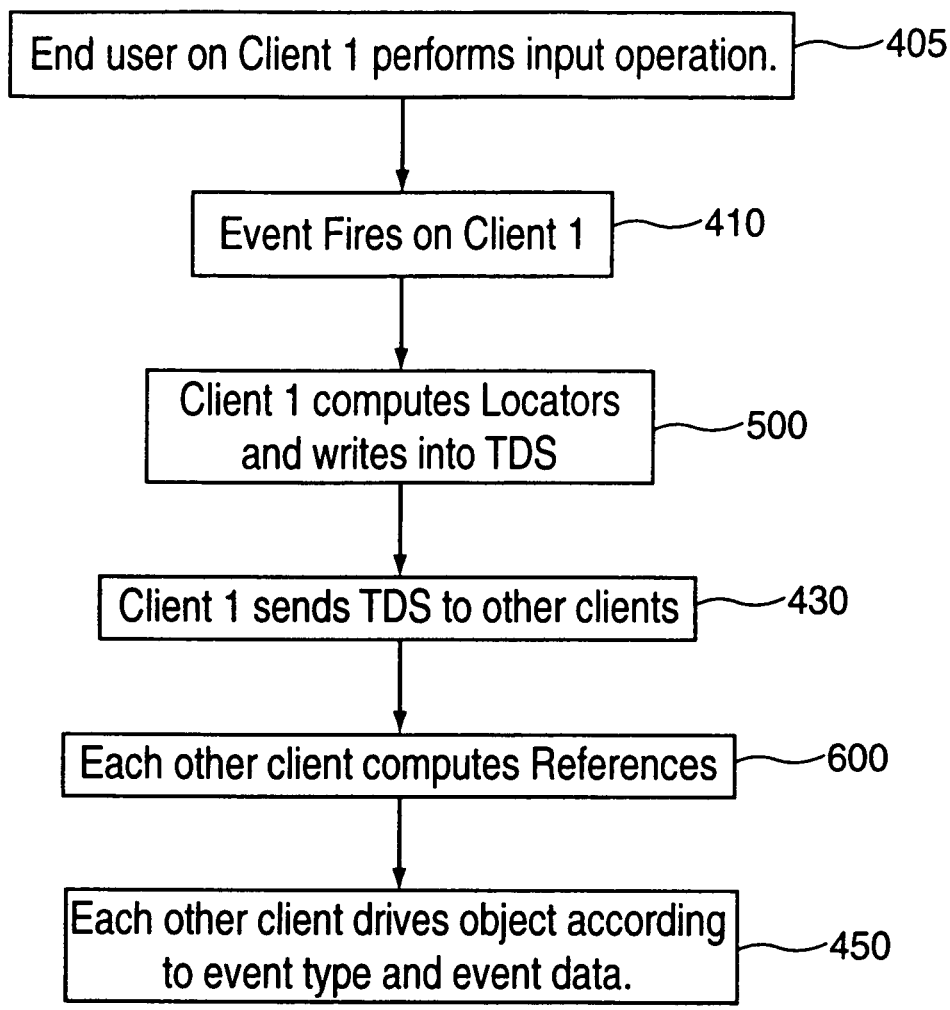
FIG. 4 shows an exemplary flow chart of a collaboration process.

FIG. 4 shows a flow chart of a collaboration process 400. In step 405, the end user at one collaboration client 110, 120, or 130, for convenience called "client 1" (e.g. 110), may perform an input operation 405 such as a keystroke, a mouse click, a tablet click, an light-pen click, etc. In step 410, the input operation causes the web browser to fire an event 265 on this client. The event may describe itself in terms of the type of event 310 and references 210R to the affected element 210 (210, 220, 230, 240) or document 205. The process 400 responds to this event 265 by computing any necessary locators from references (205R, 210R), and writing these locators and other event information into a TDS 300. See, for example, process 500. Then client 110 sends 430 the TDS 300 to each others collaboration client, for example, collaboration client/computer 120, with which client 1 (110) is collaborating. In alternative embodiments, the client 110 can send 430 the TDS 300 to each other collaboration client 120 through the server 140. Each other client, for example, collaboration client/computer 120, then reads the TDS 300 and computes references 600 from any locators 360 in the TDS 300, in order to get the address of the appropriate object. Finally, each other client, e.g., 120, drives 450 the object according to the event type 310 and event data 350, thus replicating the end user input effect. Note that, a client 120 can also be a server 140.

Figure 5:
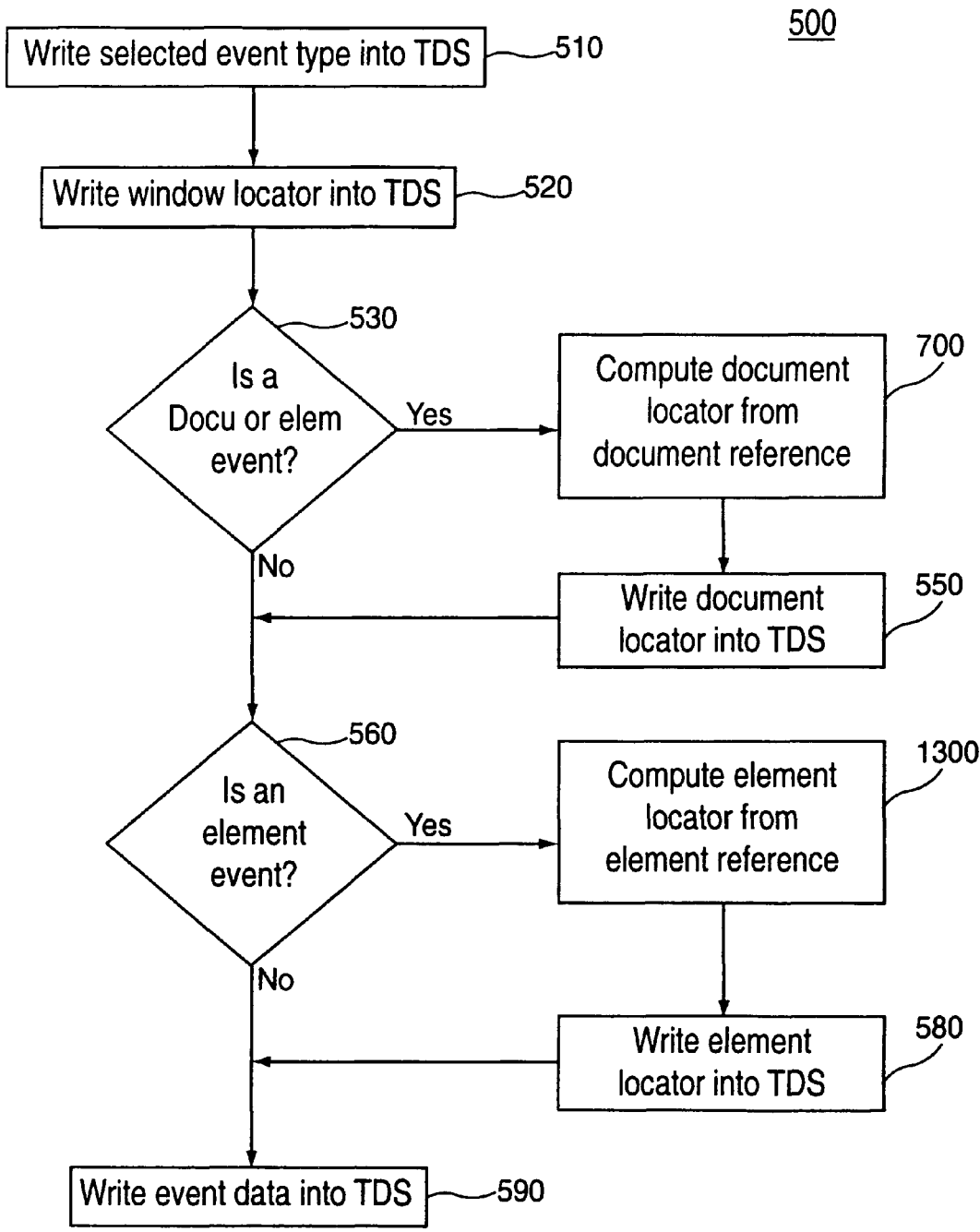
FIG. 5 shows an exemplary flow chart of a TDS construction process.

FIG. 5 shows an exemplary flow chart of a TDS 300 construction process 500 which includes computing locators 360 and writing information into the TDS 300. FIG. 5 shows in more detail how client 110 computes locators and writes 500 into the TDS 300. First, a descriptor of the event type 310 is written 510 into the TDS 300. The event type 310 can be a window event type, a document event type, or an element event type. Examples of a window event type 310 are: move, resize, maximize, minimize, restore, focus, unfocus, and close. Examples of a document event type 310 are: scroll, focus, and unfocus. Examples of an element event type 310 are: a keystroke in a text area, a keystroke in an input text field, a mouse click in an input (button, checkbox, radio, etc.), a mouse click on an anchor, a select on a single-select box, a select on a multiple-select box, a scroll on a textarea, and a scroll on a select box. These and other event types are available.

Next, a window locator 320 is written 520 into the TDS 300. See, for example, FIG. 2A regarding window locators.

Next, if the event is a document event or an element event 530, then the document locator 330 is computed 530 from the document reference 700, and written 550 into the TDS 300.

Next, if the event is an element event 560, then the element locator 340 is computed 1300 from the element reference 210R, and written 580 into the TDS 300.

Finally, if the event requires event data 350, then the event data is written 590 into the TDS 300. For example, the document scroll event requires event data for scroll offsets.

Figure 6:
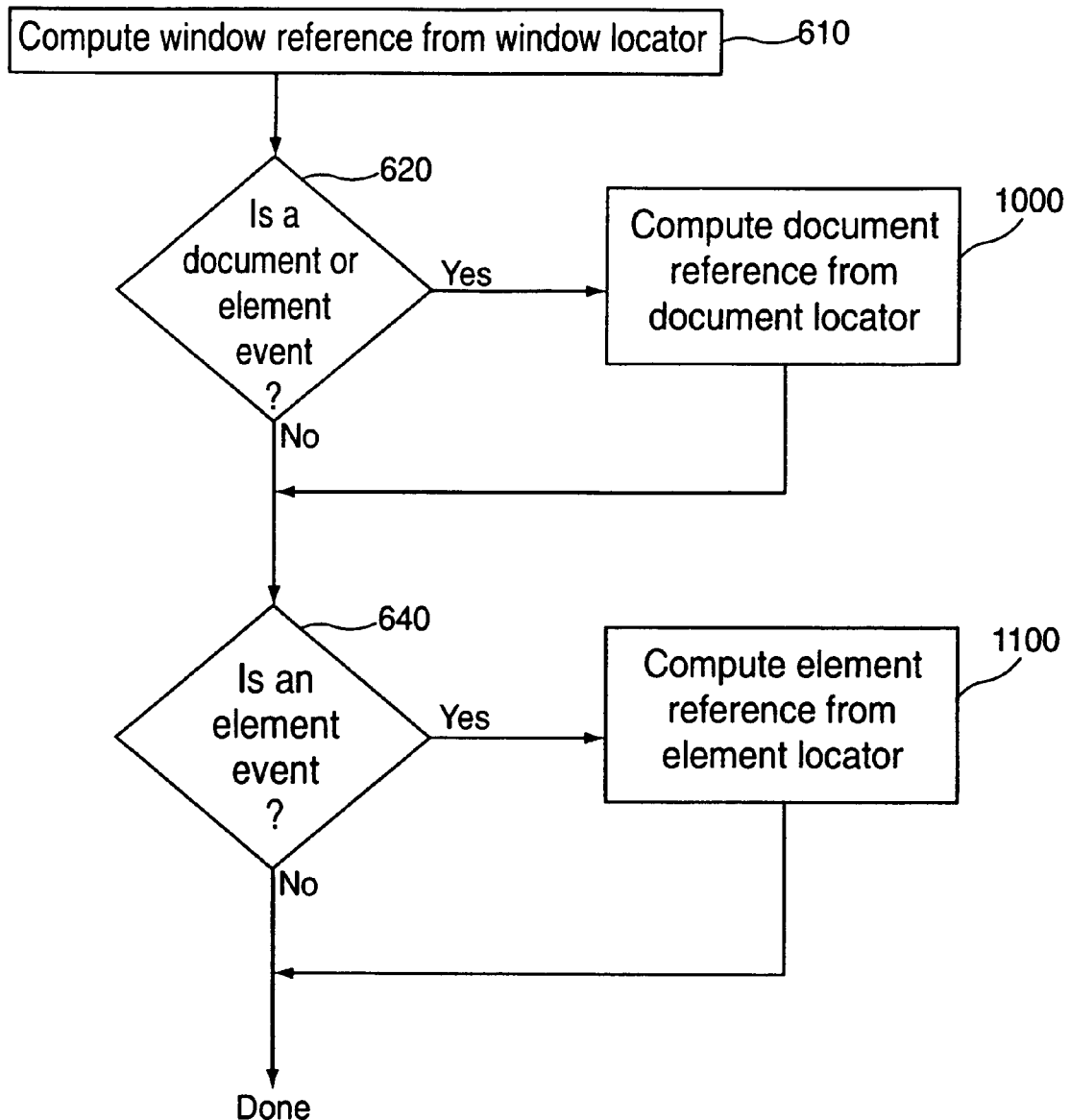
FIG. 6 shows an exemplary flow chart of a reference computing process.

FIG. 6 shows an exemplary flow chart of a reference computing process 600 used by the other collaborating clients 120. FIG. 6 shows how another client computes references 600 from the TDS 300. First, the other client 120 computes 610 a window reference 250R from the window locator 320. In another exemplary embodiment, each browser window 250 contains a copy of its window locator 320, and the client 120 maintains a collection of its browser windows. Then the client searches this collection for the given Window locator

320. By matching the window locator 320 in the TDS 300 with the window locators 320 at the client 120, the proper browser window 250 is found.

Next, if the event type 310 is one of the available document event or element event types 620, then the document reference 205R is computed 1000 from the document locator 330. See, for example, FIG. 10.

Next, if the event type 310 is one of the available element event types 640, then the element reference 210R is computed 1100 from the element locator 340. See, for example, FIG. 11.

Figure 7:
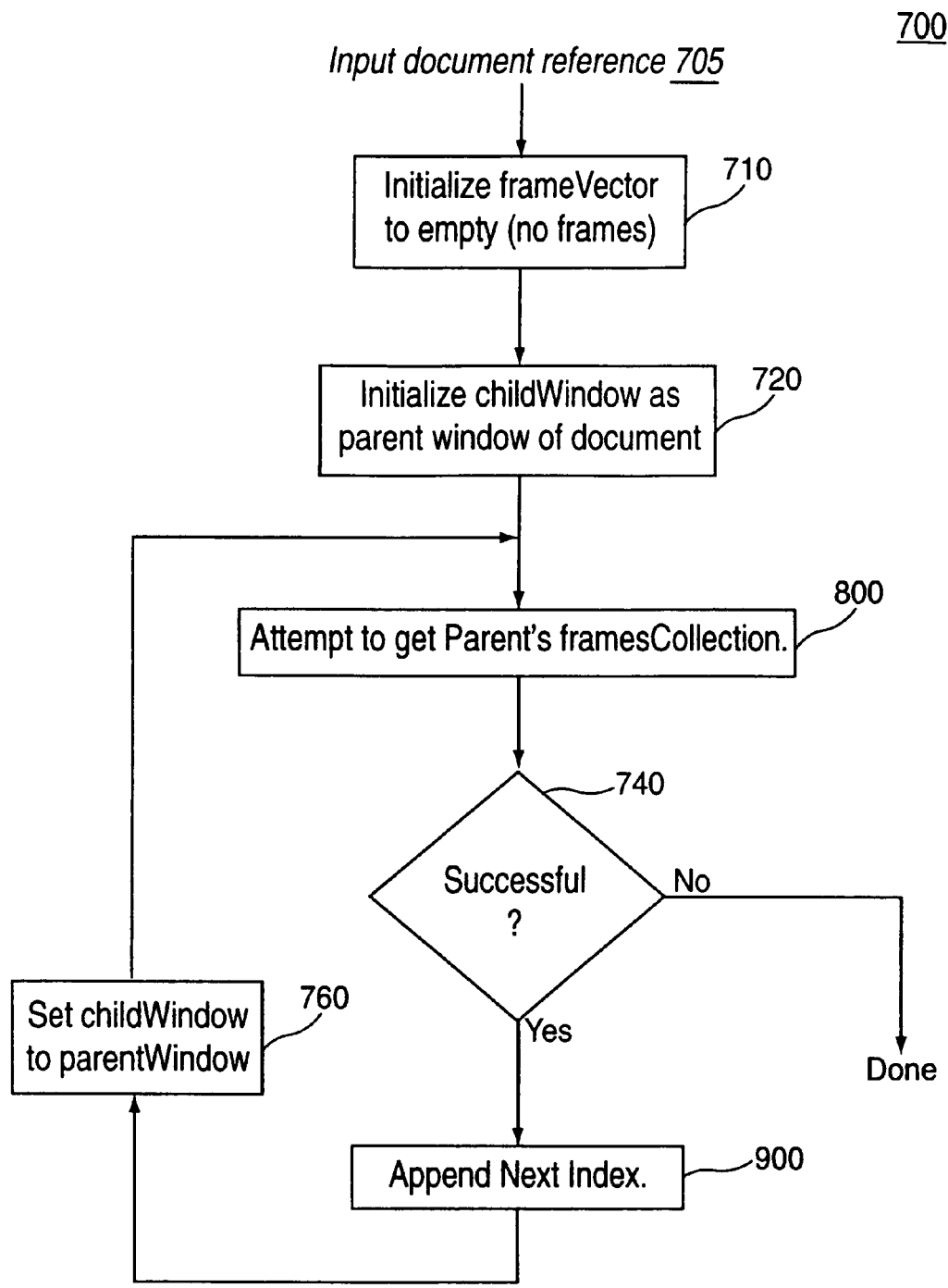
FIG. 7 shows an exemplary flow chart of a document locator computing process.

FIG. 7 shows an exemplary flow chart of a document locator computing process 700. FIG. 7 shows how to compute 700 a document locator 330 from a document reference 205R. A document locator 330 can be represented as a vector of frame indices. For example, if there are no frames, the vector is empty. As another example, if the web page contains 2 frames, and the document reference refers to the first frame, then the frame vector contains a single frame index with value 0. As a third example, if the web page contains 2 frames, and the second frame (i.e., frameset) contains 3 frames, and the document reference refers to the third frame within the second frame, then the frame vector contains two frame indices, the first with value 1, and the second with value 2. And so on. See, for example, FIG. 2A.

The process 700 may begin by obtaining a document reference 205R in step 705. The document reference 205R refers to the selected document 205.

In step 710 a variable "frameVector" is initialized to empty (no frames). After the process 700 is complete, the frameVector will contain a sequence of indices describing the document path 230.

In step 720, initialize a variable called childWindow to refer to the parent window of the document 205 whose document reference 205R is provided in step 705. Web browsers 150 provide a function to get the parent window of a document 205. It is believed that web browsers use parent windows to contain documents 205 in a one to one relationship. The parent window is represented here by the variable childWindow to facilitate traversal of the document path 230 in the hierarchical structure 290.

In step 800, the process 700 attempts to get the collection of frames associated with the parent window of the current childWindow, i.e., the value stored in the "childWindow" variable. This step 800, Attempt-to-get-framesCollection, is described in more detail in FIG. 8. This step 800 implicitly initializes a variable called parentWindow. See, for example, FIG. 8. Step 800 either returns the collection of frames and/or frame sets or returns an unsuccessful indication.

If 740 this attempt is not successful, the process 700 is complete, and the frameVector-represents the required document locator 330.

If 740 this attempt is successful, append next index 900 to the "framesVector" variable. See, for example, FIG. 9. Next, set childWindow to parentWindow 760 to continue the traversal up the hierarchy 290.

After step 760 the process 700 returns to step 800.

Figure 8:
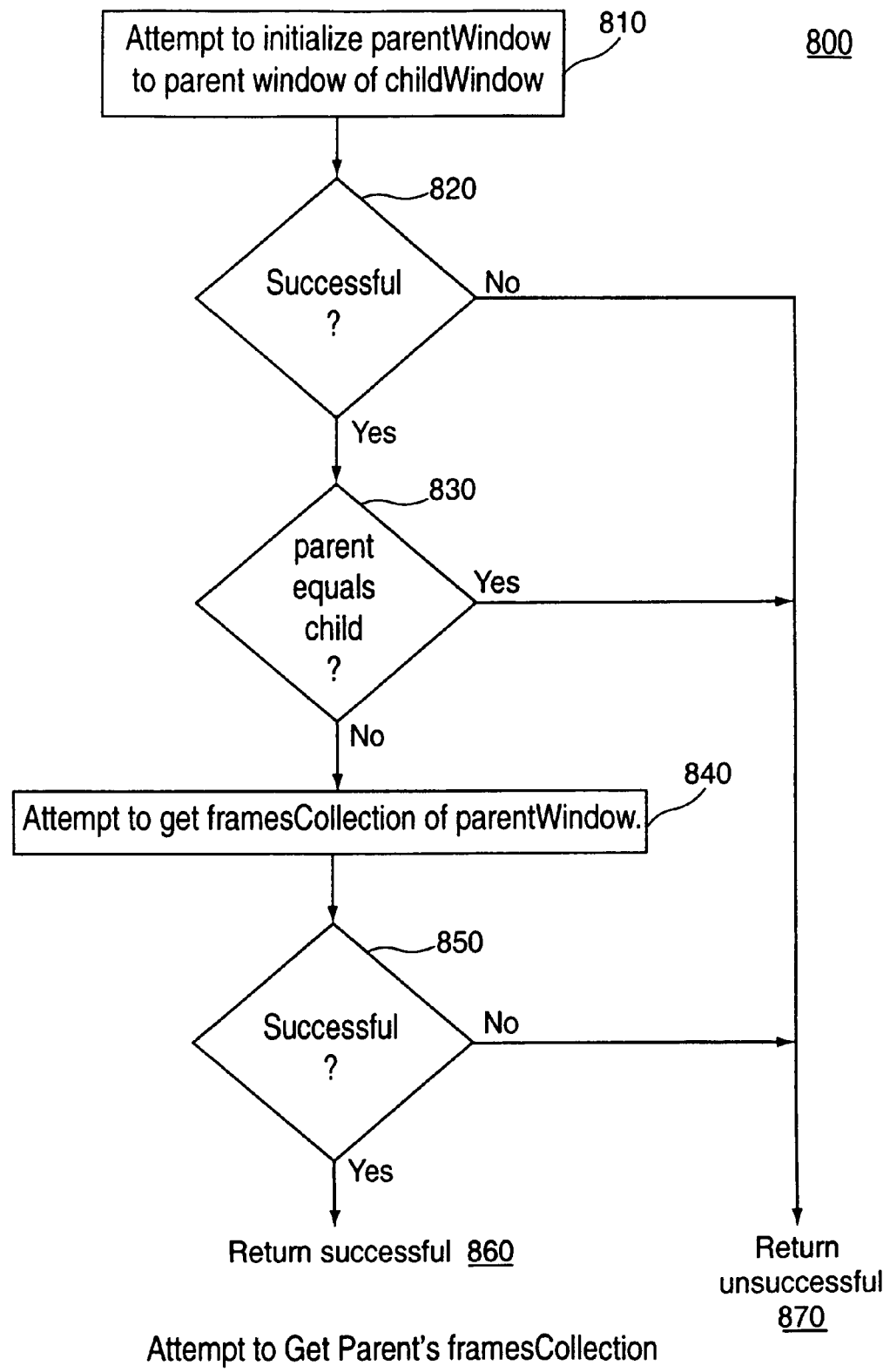
FIG. 8 shows an exemplary flow chart of an "attempt to get parent framesCollection" process.

FIG. 8 shows an exemplary flow chart of a parent framesCollection process 800. FIG. 8 shows how to attempt to get parent's framesCollection 800. First, attempt to initialize a variable called parentWindow to the parent window of childWindow 810. It is believed that web browsers have a function that can return the parent window of a given window.

If this attempt is not successful 820, that is, if there is no parent window of the given childWindow, the process 800 returns an unsuccessful indication 870. If the attempt 820 is successful, the process goes to step 830.

In step 830 if the attempt in 810 returns a parentWindow identified as, or equal to, the same window as childWindow 830, the process 800 also returns an unsuccessful indication 870. If the attempt in 810 returns a parentWindow that is not equal to the childWindow, the process 800 goes to step 840.

In step 840, the process 800 attempts to get the framesCollection of the parentWindow using an available function of the browser. In another exemplary embodiment, these functions would return a pointer to a collection of one or more frames and/or frame sets. These frames or frame sets are the those which are the children of the parentWindow.

In step 850, if step 840 is not successful, an unsuccessful indication 870 is returned. If step 840 is successful, a successful indication is returned 860.

Figure 9A:
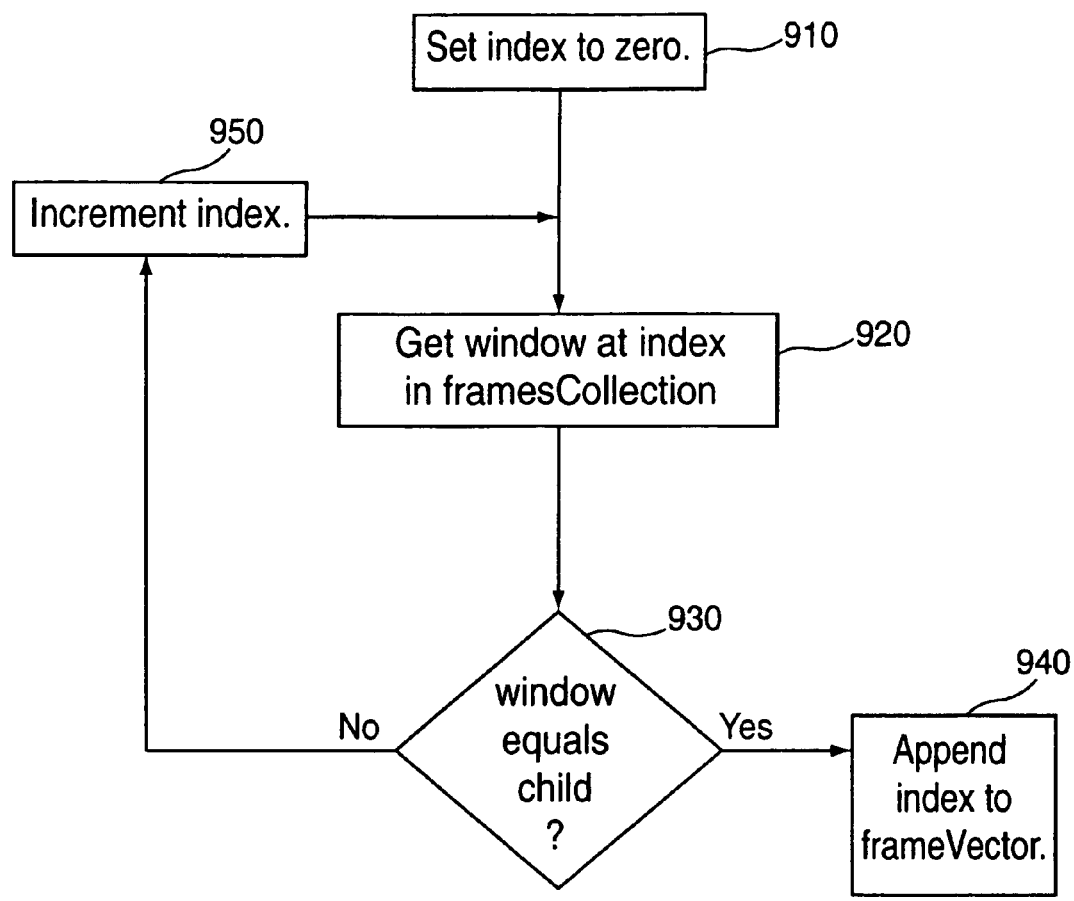
FIG. 9A shows an exemplary- flow chart of an "append next index" process.

FIG. 9A shows a flow chart of an append index process 900 which appends a "next index" to the frameVector that may ultimately be used as the document locator 330. The "next index" information is used to describe the relation between parent and child frames in the document path 230. See also, for example, FIG. 7. Process 900 determines the index of the child window (childWindow) being appended to the frameVector in the respective iteration of process 700. In another exemplary embodiment and/or method, this index may be a "count" starting form origin "0" of the respective child window with respect to the frames collection.

In step 910, the process 900 may set a variable called index to zero, i.e., origin "0". At the end of process 900, this index may be the index of the child window (childWindow) in the collection of frames being processed in the particular iteration of process 700.

In step 920, the process 900 gets the particular window that is referenced at this index value in the framesCollection. The window at this index value may or may not be the childWindow.

In an exemplary embodiment, this function may be performed by available operations on prior art web browsers.

Figure 9B:
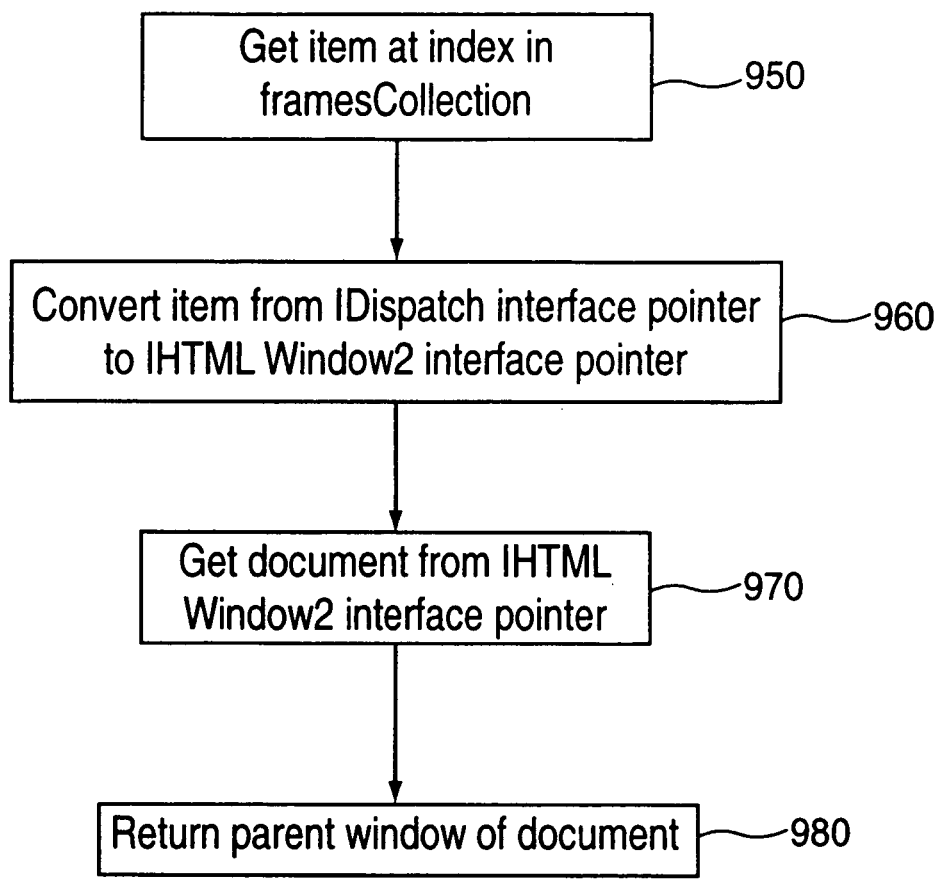
FIG. 9B shows an exemplary flow chart of a "compute window at Index in Internet Explorer release 5.0 framesCollection" process.

Another exemplary embodiment is shown in FIG. 9B. This case may apply to Internet Explorer version 5.0 (IE 5.0).

In step 930, it is determined whether the window returned in step 920 equals the childWindow (initialized in step 720). If the windows are not equal, the index is incremented 950 and the process 900 returns to step 920. If the windows are equal, the index is appended 940 to the frameVector.

FIG. 9B may be a flow chart of an alternative process to get window at index in framesCollection 920A. FIG. 9B shows how to get the window at a given index in a framesCollection 920 for Microsoft's ™ Internet Explorer™ release 5.0.

In step 955 the process 920A gets an IDispatch interface pointer that may be referenced at the given index in the framesCollection 955.

In step 960, the process 920A converts the IDispatch interface pointer to an IHTMLWindow2 interface pointer.

In step 970, the process 920A gets the document 205 from this IHTMLWindow2 interface pointer.

In step 980, the process 920A returns the parent window of the document 205. Note that for the particular browser IE5, the parent window that is returned in step 980 is different from the window that corresponds to the IHTMLWindow2 interface pointer in step 960. However, the returned window is the correct window to be compared with the childWindow in step 930. This exemplary embodiment illustrated the computing document locator from document reference in process 700. For another exemplary embodiment and/or method addition to the process 500, computing locators and writing into the TDS, see, for example, FIG. 13.

Figure 10A:
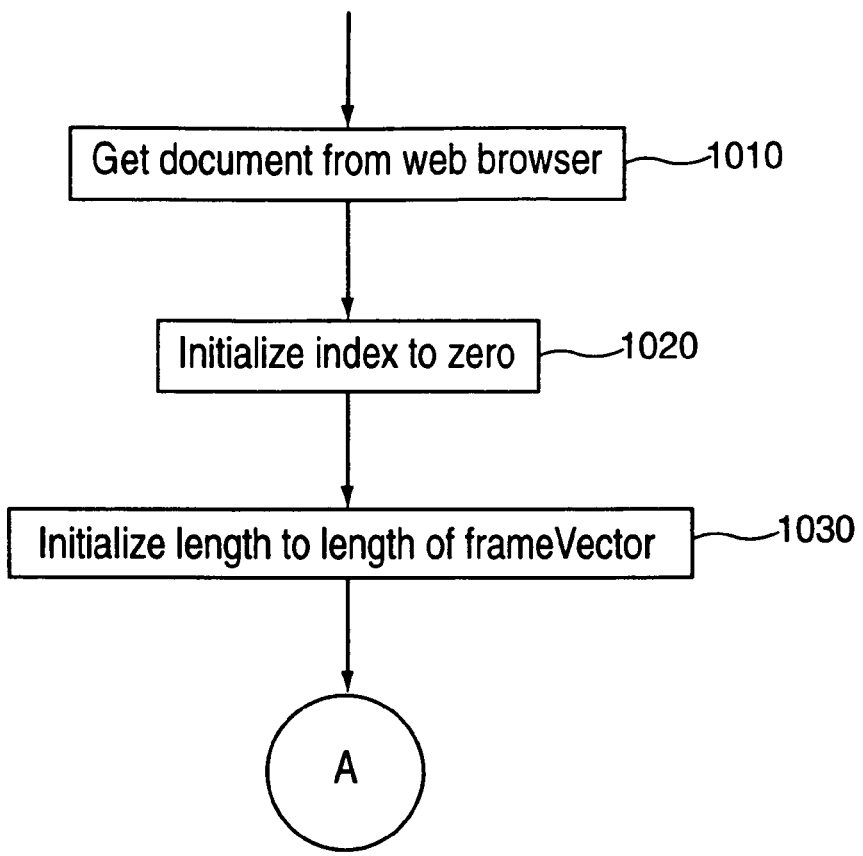
FIG. 10 shows an exemplary flow chart of a "document reference computing" process.
Figure 10:
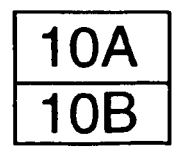
Figure 10B:
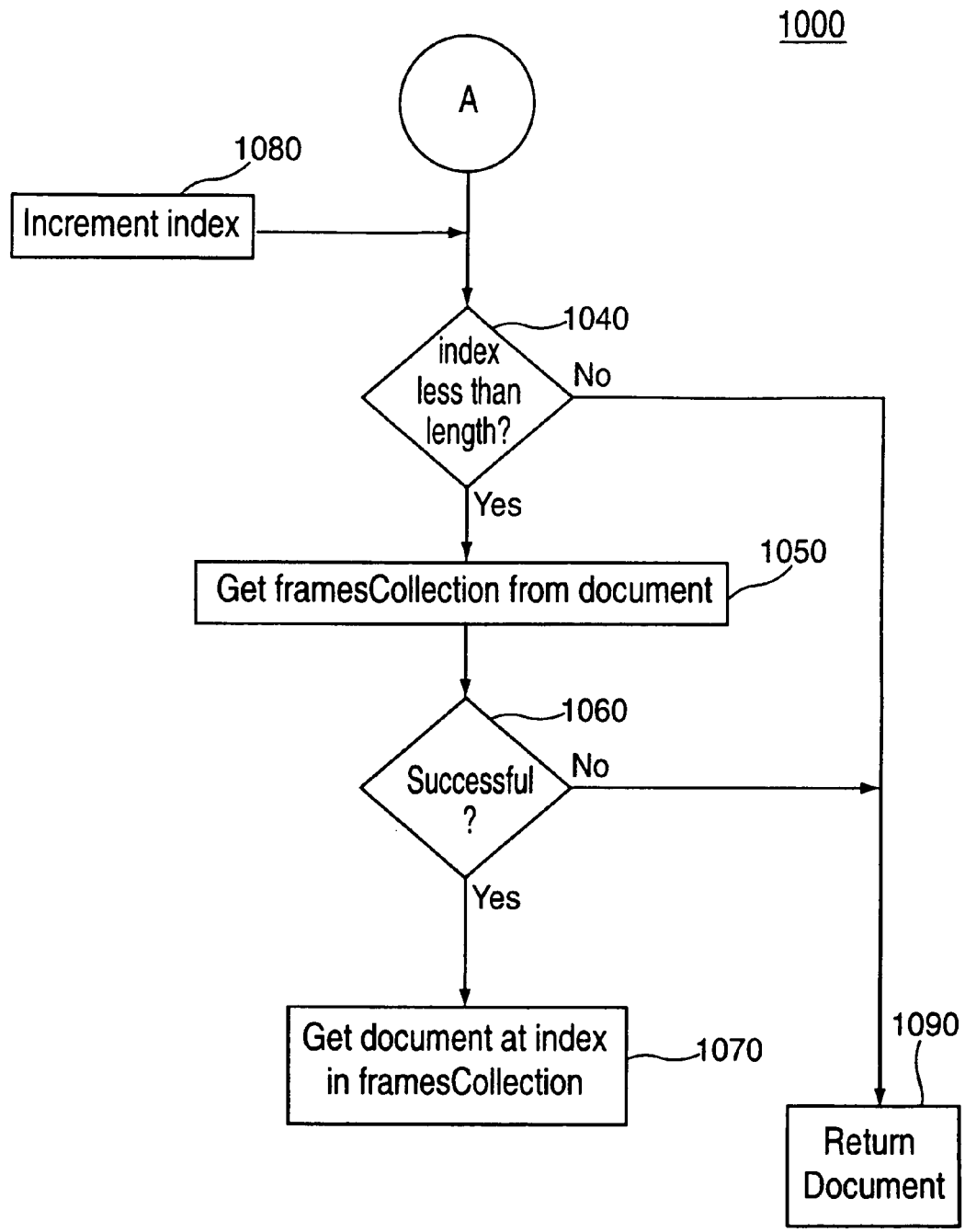

FIG. 10 shows an exemplary flow chart of a document reference computing process 1000 and shows how to compute the document reference 205R from the document locator 330. This process 1000 is part of process 600. Process 1000 shows the detailed steps of computing a document reference 205R from a document locator 330.

In step 1010, the process 1000 gets the document 205 contained in the web browser, and uses it to initialize a variable called "document".

In step 1020, the process 1000 initializes an index, called "dindex" to zero 1020.

Next, initialize a variable called "length" to the length of the frameVector 1030 that is input to the procedure from the document locator 330.

In step 1040, a check of the length is performed. If the dindex is not less than the length 1040, the document is returned, step 1090. Note that this condition is also executed after Step 1080. This indicates that the path 230 is completely traversed and the document that in contained in the "document" variable references the document specified by the document locator 330.

If the dindex is less than the length 1040, the process 1000 proceeds to step 1050.

In step 1050, the process 1000 gets the framesCollection from the "document" variable by using available functions of the browser.

In step 1060, if step 1050 is unsuccessful, the process proceeds to step 1090, i.e., the document reference in the "document" variable is returned. If step 1050 is successful 1060, the process goes to step 1070.

In step 1070, the process 1000 gets the document at dindex in framesCollection using available browser functions. This document then updates the "document" variable.

The process 1000 then goes to step 1080 where "dindex" is incremented. The process 1000 now returns to step 1040. Thus, each iteration of process 1000 moves along the document path 230 and determines if the document reference in the "document" variable is at the end (complete traversal) of the document path 230.

Figure 11A:
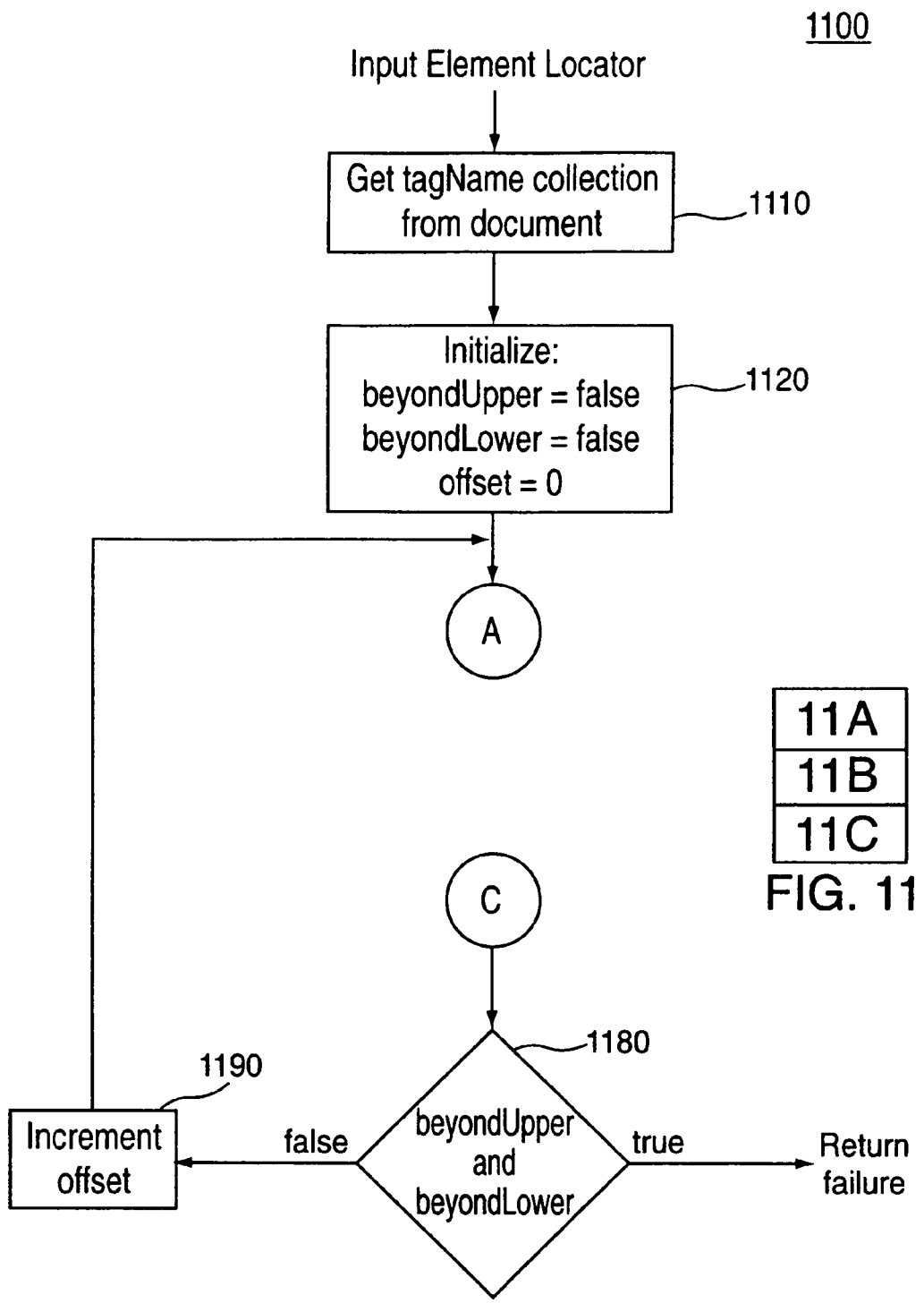
FIG. 11 shows an exemplary flow chart of an "element reference computing" process.
Figure 11B:
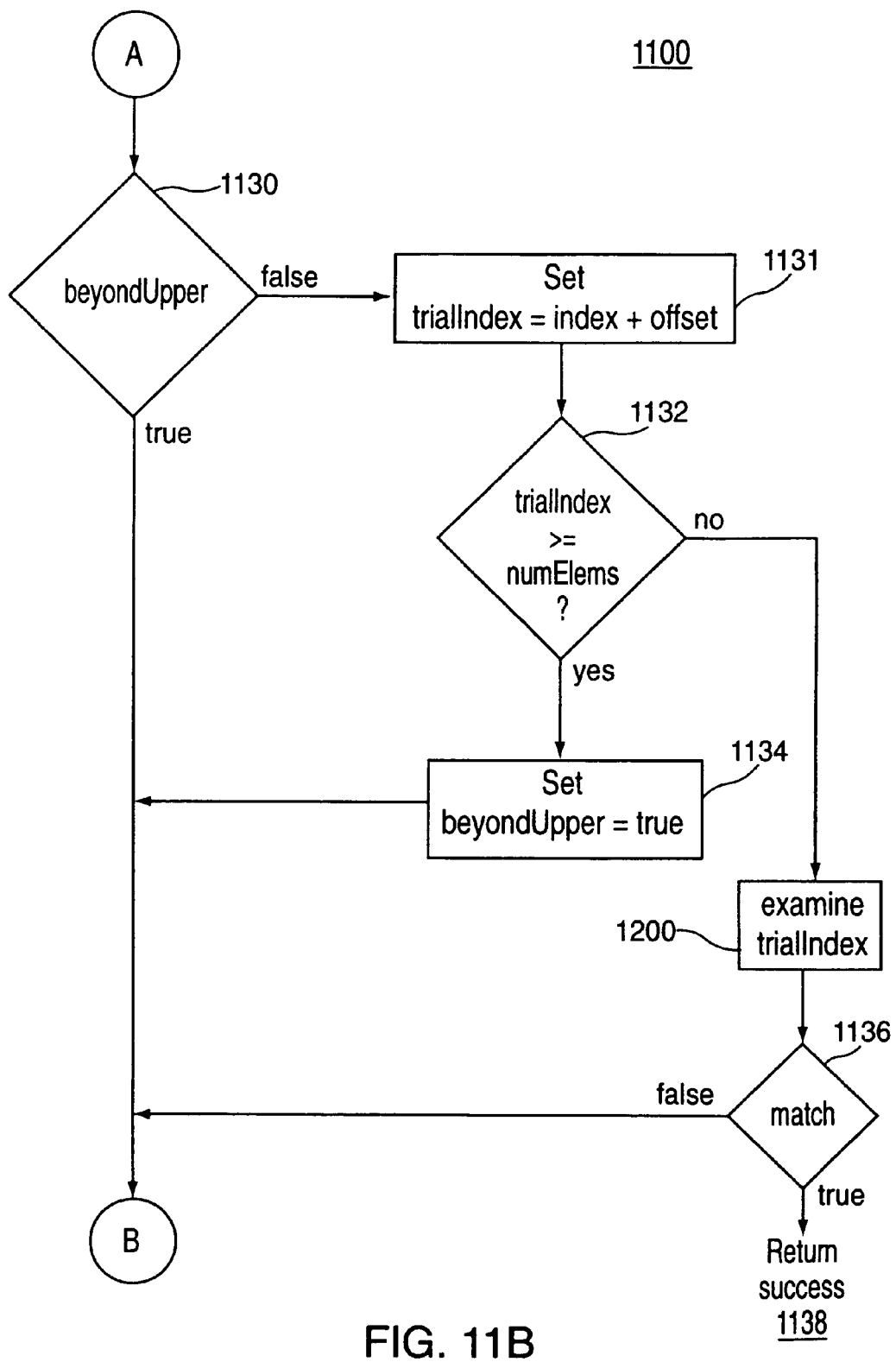
Figure 11C:
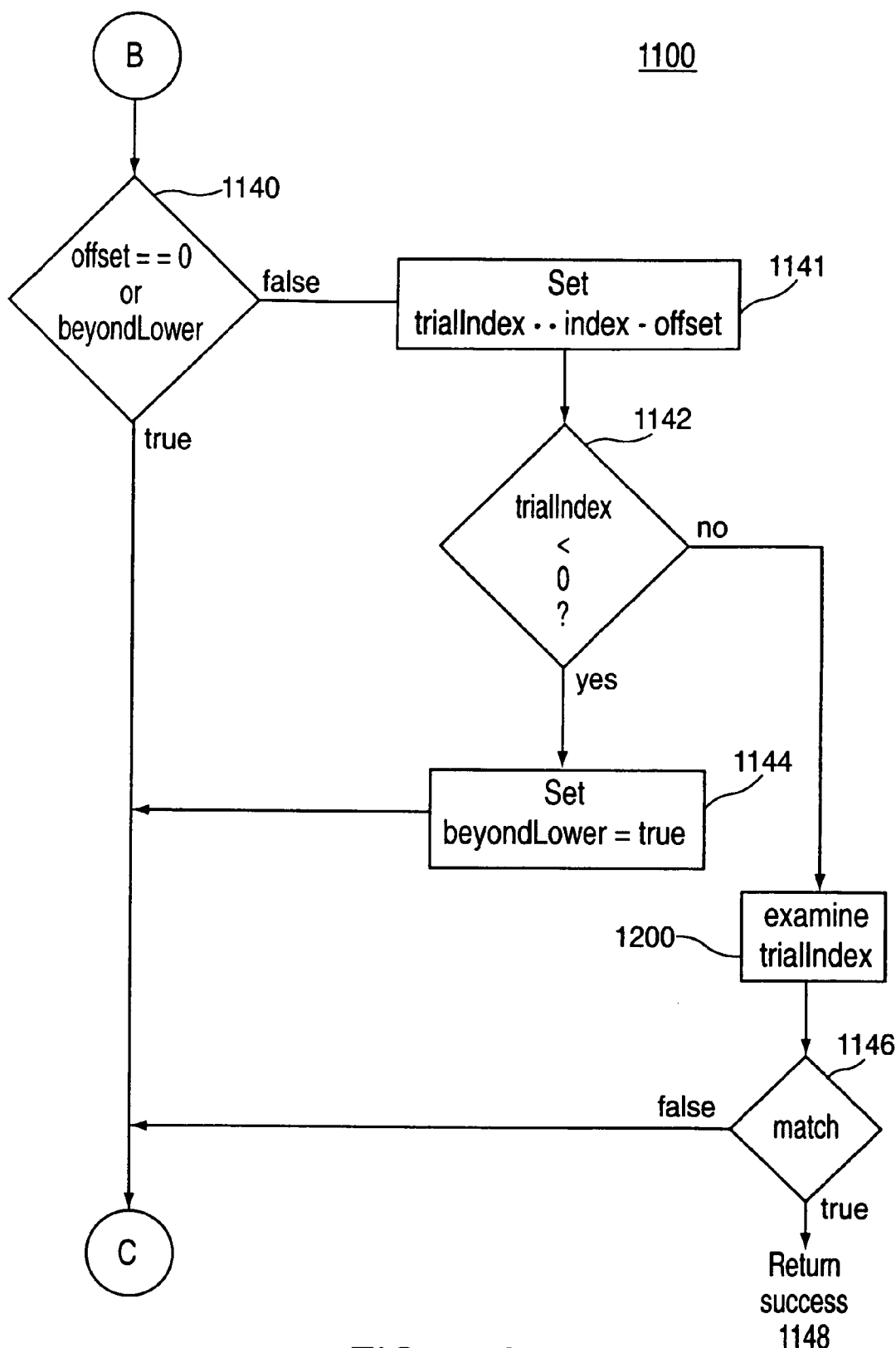

FIG. 11 shows an exemplary flow chart of an element reference computing process 1100. FIG. 11 shows how to compute 1100 an element reference 210R from an element locator 340. In another exemplary embodiment, this may be effected by searching through a collection of element references 210R from the document 205 being processed. The search begins at the index value stored in field 341 of the element locator 340 and proceeds above and below this index value until a match is found or the collection is exhausted.

In step 1110, the process 1100 gets the tagName collection from the document 205 being processed. Step 1110 gets the tagName collection of the document using the tagName value 341 in the element locator 340. For example, if the tagName value 341 is textarea, then the tagName collection is a "textarea collection." Generally, elements have specific available tagName collections.

In step 1120, the Boolean variables "beyondUpper" and "beyondLower" are both initialized to false, and an integer variable "offset" is initialized to zero.

Step 1130 performs a test to determine whether "beyondUpper" is True or False. If True, a "beyondLower" test is perform in step 1140. If False, the process 1100 goes to step 1131.

In step 1131, a "trialIndex" is set equal to the index plus the offset. Then the process goes to step 1132.

Step 1132 tests whether the trialIndex is greater than or equal to a numElems variable, where "numElems" is the number of elements in the tagName collection. See step 1110.

If the trialIndex is not greater than or equal to the numElems variable, the process 1100 proceeds to step 1200.

If the trialIndex is greater than or equal to the numElems, then the process 1100 goes to step 1134.

In step 1134, the "beyondUpper" variable is set to True and the process goes to step 1140.

In step 1200 the trialIndex is examined. See FIG. 12. Then the process 1100 goes to step 1136.

Step 1136 determines if a match was determined by process 1200. If not, the process 1100 goes to step 1140. If there is a match, the process 1100 returns a successful indication 1138. This indicates that the element reference 210R was found by process 1200.

Step 1140 performs a test to determine whether the "offset" is equal zero OR the "beyondLower" variable is True. If this Boolean statement is True, the process 1100 goes to step 1180. If this Boolean statement is False, the process 1100 goes to step 1141.

In step 1141, a "trialIndex" is set equal to the index minus the offset. Then the process goes to step 1142.

Step 1142 tests whether the trialIndex is less than zero. If the trialIndex is not less than zero the process 1100 proceeds to step 1200. If the trialIndex is greater than zero, then the process 1100 goes to step 1144.

In step 1144, the "beyondLower" variable is set to True and the process goes to step 1180.

In step 1200 the trialIndex is examined. See FIG. 12. Then the process 1100 goes to step 1146.

Step 1146 determines if a match was determined by process 1200. If not, the process 1100 goes to step 1180. If there is a match, the process 1100 returns a successful indication 1148. This indicates that the element reference 210R was found by process 1200.

Step 1180 tests whether the "beyondUpper" AND "beyondLower" Boolean expression is True or False. If True, the process 1100 returns a failure indication. This indicates that the changes of mutant web page could not be resolved for the collaboration. Another identification string may resolve this problem. If False, the process 1100 goes to step 1190.

In step 1190, the offset variable is incremented and the process returns to step 1130.

Figure 12:
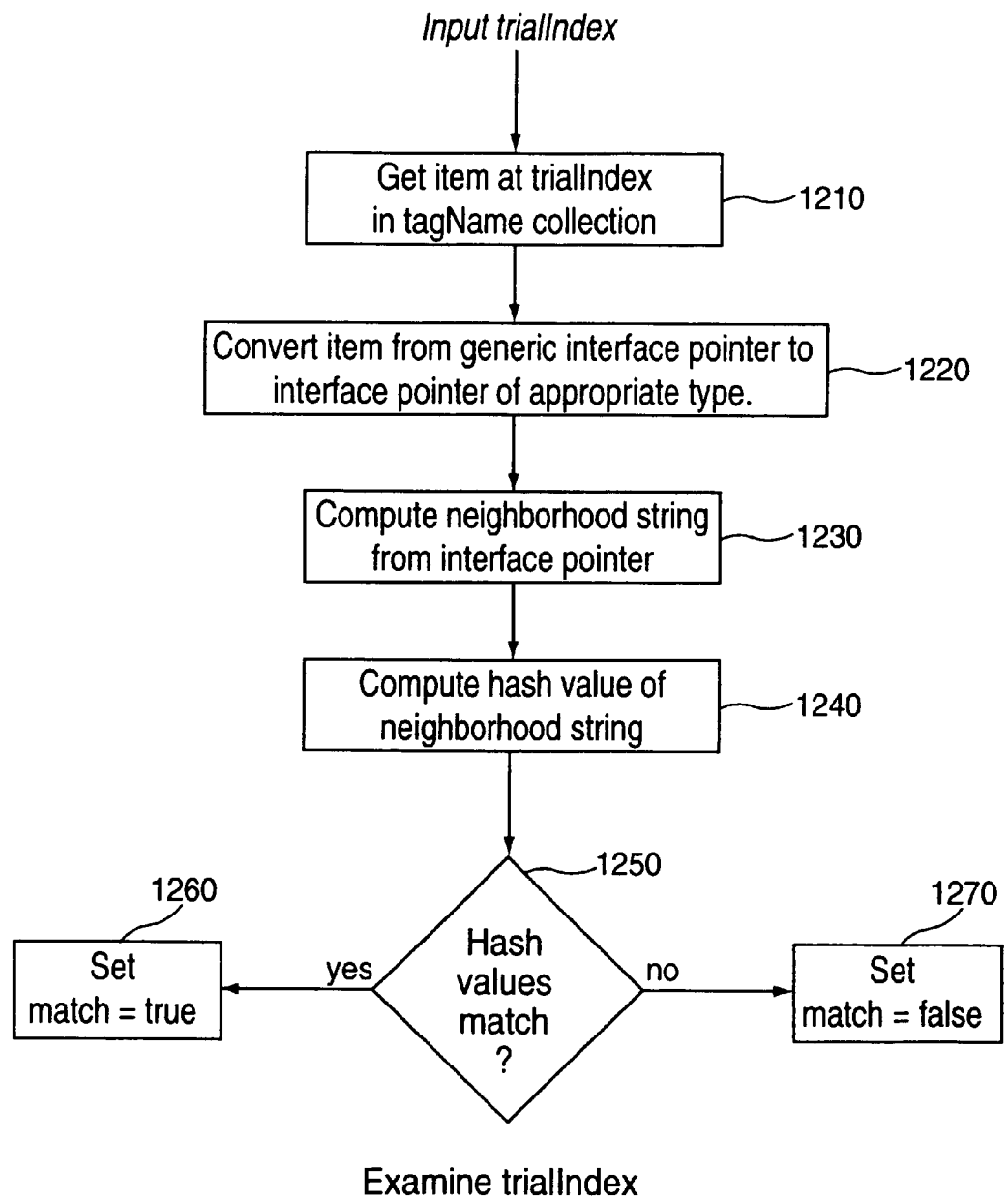
FIG. 12 shows an exemplary flow chart of an examine trial index process.

FIG. 12 shows in more detail how to examine 1200 the trialIndex of FIG. 11. The trialIndex points to a trial element that is checked to determine if the trialIndex represents the correct element in the document 205 of the mutant web page.

In step 1210, the process 1200 gets the generic interface pointer at trialIndex in the tagName collection. An example of a generic interface pointer in Internet Explorer™ is IDispatch.

In step 1220, the process 1200 converts the item from a generic interface pointer to an interface pointer of the appropriate type for the element. These conversions are available.

In step 1230, an identification string is computed from the interface pointer computed in step 1220. In another exemplary embodiment, one or more attributes of the element 210 corresponding to the interface pointer may be concatenated into an identification string (see FIG. 2C). Attributes are selected that do not vary in the collaboration environment. In another exemplary embodiment, such attributes can include the ID attribute and/or the NAME attribute of the element (HTML object) and/or its "neighborhood" (nearby elements) on the web page. Delimiters can be written between the fields of the string to avoid certain ambiguous descriptions.

In step in step 1240, the identification string is then hashed to produce a hash value. This can be done using any available hash function.

Next, step 1250 compares the hash value just computed with the hash value 342 in the Element Locator 340. If the hash values match, set match to true 1260; otherwise, set match to false 1270.

Figure 13:
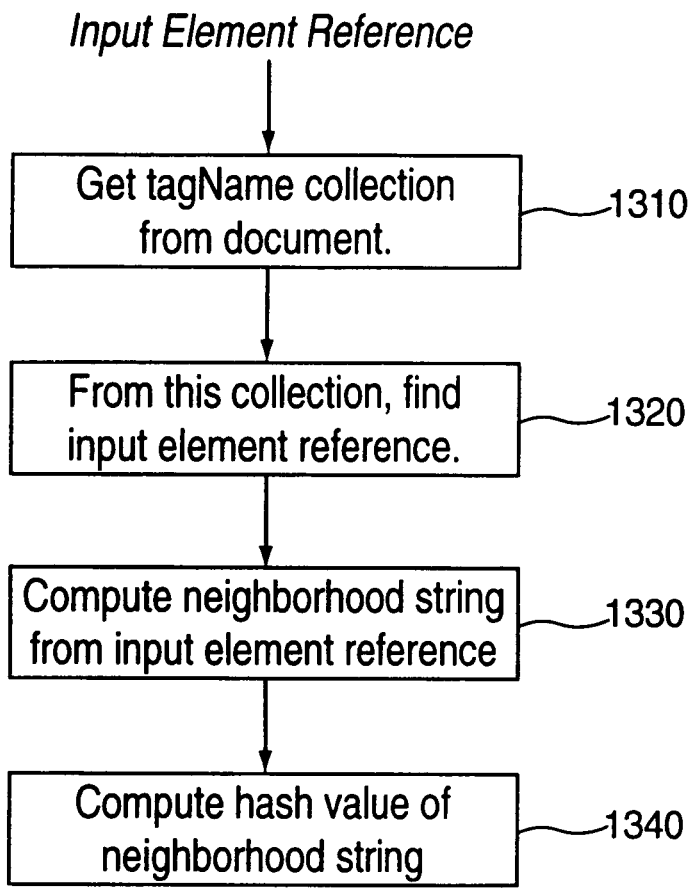
FIG. 13 shows an exemplary flow chart of an "element locator computing" process.

FIG. 13 shows an exemplary flow chart of an element locator computing process 1300 that computes element locators 340 from element references 210R. This process 1300 may be performed as part of process 500, computing locators and writing to the TDS.

In step 1310, the process 1300 gets the tagName collection for the element reference 210R inputted from the document 205 being processed by process 500. The tagName determined in this step is stored in field 341 of the element locator 340. For example, if the input element reference 210R references a textarea, then the tagName collection is a "textarea collection." It is believed that elements have specific available tagName collections.

In step 1320 the element reference 210R for the inputted element 210 is found. This may be accomplished by iteratively comparing each member of the tagName collection to element reference 210R that was provided in the input. Each iteration is tracked by a tracking index. When there is a match, the tracking index indicates the location of the element reference 210R in the tagName collection. The tracking index is stored in field 341 of the element locator 340.

In step 1330, an identification string is computed from the input element reference 210R. In another exemplary embodiment, one or more attributes of the element 210 may be concatenated into an identification string (see FIG. 2C). Attributes may be selected that do not vary in the collaboration environment. In another exemplary embodiment, such attributes can include the ID attribute and/or the NAME attribute of the element (HTML object) and/or its "neighborhood" (nearby elements) on the web page. Delimiters can be written between the fields of the string to avoid certain ambiguous descriptions.

In step 1340, the identification string is then hashed to produce a hash value that is stored in field 342 of element locator 340. The purpose of hashing is to allow a compact representation of the identification string to be communicated and stored, while still allowing a fairly reliable test for equality.

Figure 14:
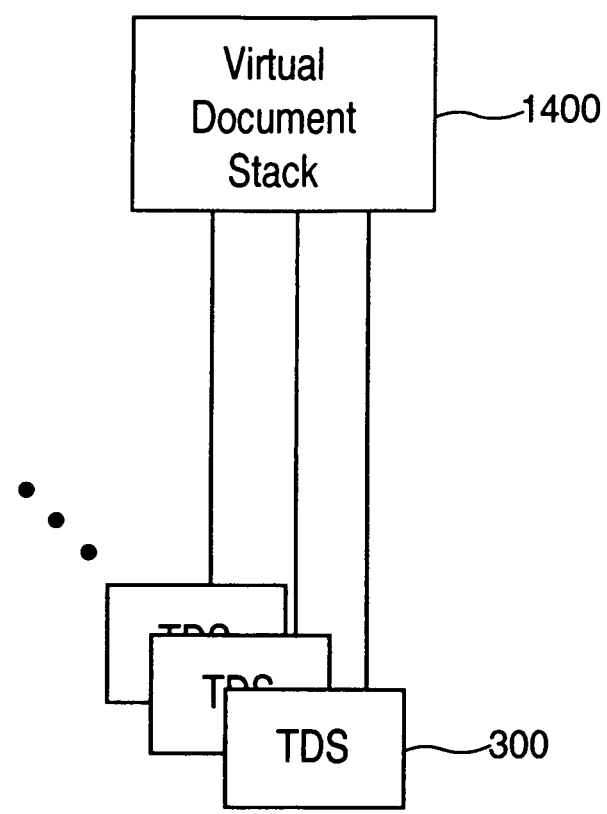
FIG. 14 shows an exemplary diagram of a virtual document stack.

FIG. 14 shows a diagram of a virtual document stack 1400. The virtual document stack 1400 contains one or more TDS 300 structures for a collaboration sessions. Other stacks 1400 can be used for one or more other collaboration sessions.

Collaborators that are collaborating by using a sensor containing the virtual document stack 1400 can review the history of the collaboration. In addition, the virtual document stack 1400 can be used to accommodate "late comers" to the collaboration session. This may be accomplished by sending all or part of the virtual document stack to a requesting collaborator. The collaborator then takes each of the TDSs 300 and uses the process steps 600 and 450 of FIG. 4 to recreate the respective portions (states of collaboration) of the collaboration sessions. By going through the virtual document stack 1400 in this way, a collaborator can come to the current state of the collaboration.

In another exemplary embodiment of the present invention, the stack is implemented much like a multimedia stream. The event changes are seen as deltas applied to the base document. Periodically, the base document may be re-established on the stack in order to ease the synchronization of "late comers" to the collaboration session.

In another exemplary embodiment of the present invention, the deltas can be consolidated to the minimal events that would allow for a reduced set of deltas for the synchronization of collaboration participants. This would be achieved by combining events that nullify the functionality of each other. Additionally, events that are repeated would be combined through the use of a count to identify the repetition of events without re-specifying each individual event (Run Length Encoding). Further, if interleaved events are not dependent then the repetitious events that do not have serial dependencies can be combined. Further, higher level repetition of sets of events can be combined and have a repetition count sent with a single specification of the event chain, in order to further reduce the communication among collaboration participants.

The virtual document stack 1400 can contain a set of TDS 300 for each of one or more documents. Therefore, the virtual document stack 1400 can represent and track changes to more than one document in the collaboration session(s).

Note that, in another exemplary embodiment of the present invention, a first event occurring on a first document will cause a first TDS 300 to be created. This first event, could cause a change one or more second documents. These changes may initiate second events on each of these respective second documents that would cause the creation of necessary second TDS 300.

The various embodiments and/or methods of the present invention may be used together and separately in various combinations.

Several embodiments and/or methods of the present invention are specifically illustrated and described herein. However, it will be appreciated that modifications and variations of the present invention are covered by the above teachings and within the purview of the appended claims without departing from the spirit and intended scope of the invention.

What is claimed is:

1. A collaboration computer system having at least one memory, at least one central processing unit (CPU), at least one web browser, and at least one network connection, comprising:
   at least one window locator that uniquely identifies a web browser window of the at least one web browser where an event occurred;
   at least one document locator derived from information describing a document path from the web browser window to at least one document within the web browser window, the document path being a path in a hierarchical structure that includes the document and the web browser window; and
   a communicable virtual stack storing at least one transfer data structure on a collaboration computer, the at least one transfer data structure containing the at least one window locator and the at least one document locator, the virtual stack and the at least one transfer data structure stored therein is communicable through one or more of the at least one network connections via a collaboration server or a peer-to-peer communication to enable a collaboration session with at least one other collaboration computer having at least one of a different platform, operating system or web browser over a Distributed Internet Services system that comprises one or more networks connected to one or more Enterprise Information System (EIS) tiers, one or more component server tiers and one or more target/client tiers.

2. The collaboration computer system of claim 1, further comprising:
   at least one positional reference maintained as the stack of events being applied to a base document.

3. The collaboration computer system of claim 2, wherein the base document is re-established as a re-established base document in the stack of events as a frame with at least one subsequent event recorded on the stack of events.

4. The collaboration computer system of claim 3, wherein the re-established base document is configured to be used to efficiently synchronize any new participant in a collaboration session.

5. The collaboration computer system of claim 1, where the hierarchical structure is based on a Dynamic Hypertext Markup Language (DHTML) model.

6. The collaboration computer system of claim 1, further comprising at least one element locator that uniquely defines an element within the document.

7. The collaboration computer system of claim 6, wherein the element belongs to at least one Hypertext Markup Language (HTML) type, the Hypertext Markup Language (HTML) type being at least one of a hyperlink, an input text field, a text area, a button, a checkbox, a radio button, an anchor, a single-select box, a multiple-select box, a script, and a Java script.

8. The collaboration computer system of claim 6, wherein the element locator includes at least one of a value, a persisted object, an object, a string, a hash value, an index, and a tagName.

9. The collaboration computer system of claim 1, wherein the window locator includes at least one of an integer, a number, a persisted object, an object, a name, a value, and a string.

10. The collaboration computer system of claim 1, wherein the event includes at least one of a computer input, a key stroke, a mouse click, a touch on a touch screen, a click on a tablet, a drag, a mouse movement, and a voice input.

11. The collaboration computer system of claim 1, wherein the document locator is a vector of one of zero document frame indices and more than zero document frame indices, the document frame indices identifying one of zero document frames and more than zero document frames within another document frame associated with the document path.

12. The collaboration computer system of claim 1, wherein a web page including the at least one document is retrieved from at least one web server through at least one network interface.

13. The collaboration computer system of claim 1, wherein the at least one document is resident on at least one of the other collaboration computers.

14. The collaboration computer system of claim 1, wherein the at least one document includes at least one specific element including at least one of one or more content objects, one or more presentational components, one or more transactional components, and one or more relational data.

15. The collaboration computer system of claim 1, wherein the transfer data structure includes an event type.

16. The collaboration computer system of claim 15, wherein the event type includes at least one of a window event type, a document event type, an element event type, a move, a mouse move, a resize, a maximize, a minimize, a restore, a focus, an unfocus, a close, a scroll, a keystroke in a text area, a keystroke in an input text field, a mouse click in an input, a button press, a checkbox select, a radio button press/selection, a mouse click on an anchor, a select on a single-select box, a select on a multiple-select box, a scroll on a text area, a scroll on a content area, a computer input, a touch on a touch screen, a click on a tablet, a drag, and a scroll on a select box.

17. The collaboration computer system of claim 15, wherein the event type includes an interaction with a browser plug-in.

18. The collaboration computer system of claim 17, wherein the interaction with a browser plug-in includes at least one of a window event type, a document event type, an element event type, a move, a mouse move, a resize, a maximize, a minimize, a restore, a focus, an unfocus, a close, a scroll, a keystroke in a text area, a keystroke in an input text field, a mouse click in an input, a button press, a checkbox select, a radio button press/selection, a mouse click on an anchor, a select on a single-select box, a select on a multiple-select box, a scroll on a text area, a scroll on content, a computer input, a touch on a touch screen, a click on a tablet, a drag, and a scroll on a select box.

19. The collaboration computer system of claim 1, where the transfer data structure further comprises an event data field.

20. The collaboration computer system of claim 19, where one or more event data entries in the event data field includes any one or more of the following: a horizontal scroll position, a vertical scroll position, a scroll offset, a new value, a new string, a new text, a change of text, a select option, a set of select options, a move position, a horizontal move position, a vertical move position, a horizontal window resize value, and a vertical window resize value.

21. The collaboration computer system of claim 20, where the event data entry transforms any one or more of the scroll data and position data into percentage based information that allow for different display devices to render the correct scroll position for collaborating computer systems.

22. The collaboration computer system of claim 1, wherein the transfer data structure comprises a data structure that is an asset distributed by the Distributed Internet Services system.

23. The collaboration computer system of claim 1, wherein the transfer data structure comprises a data structure that is an asset discovered by the Distributed Internet Services system.

24. The collaboration computer system of claim 1, wherein the transfer data structure comprises a data structure that is an asset exported by the Distributed Internet Services system.

25. The collaboration computer system of claim 1, wherein the transfer data structure comprises a data structure that is an asset processed by the Distributed Internet Services system.

26. The collaboration computer system of claim 1, wherein the transfer data structure comprises a data structure that is an asset targeted by the Distributed Internet Services system.

27. The collaboration computer system of claim 1, wherein the transfer data structure comprises a data structure that is an asset deployed by the Distributed Internet Services system.

28. The collaboration computer system of claim 1, wherein the transfer data structure comprises a data structure that is an asset synchronized by the Distributed Internet Services system.

29. A method for collaboration on a network comprising the steps of:
uniquely identifying a web browser window, an event having occurred at the web browser window, with a window locator;
uniquely identifying at least one document with a document locator, the document locator derived from information describing a document path from the web browser window to the at least one document, the at least one document being within the web browser window, the document path being in a hierarchical structure that includes the at least one document and the web browser window;
creating a communicable virtual stack storing at least one transfer data structure each containing the window locator and the document locator; and
communicating the virtual stack and the transfer data structure(s) stored therein to at least one other collaboration computer having at least one different platform, operating system or web browser through at least one network connection via a collaboration server or a peer-to-peer communication over a Distributed Internet Services system that comprises one or more networks connected to one or more Enterprise Information System (EIS) tiers, one or more component server tiers, and one or more target/client tiers, thereby enabling a collaboration session therewith.

30. A computer system for collaboration comprising:

at least one memory, at least one central processing unit (CPU), at least one web browser, and at least one network connection in a configuration whereby said central processing unit executes collaboration steps to:

uniquely identify a web browser window, an event having occurred at the web browser window, with a window locator;

uniquely identify at least one document with a document locator, the document locator derived from information describing a document path from the web browser window to the document, the at least one document being within the web browser window, the document path being in a hierarchical structure that includes the at least one document and the web browser window;

create a communicable virtual stack storing at least one transfer data structure on one client computer, the transfer data structure(s) each containing the window locator and the document locator; and communicate the virtual stack with the transfer data structures stored therein to at least one other collaboration computer having at least one different platform, operating system or web browser through at least one network connection via a collaboration server or a peer-to-peer communication over a Distributed Internet Services system that comprises one or more networks connected to one or more Enterprise Information System (EIS) tiers, one or more component server tiers, and one or more target/client tiers, thereby enabling a collaboration session therewith.

31. A computer program product having a memory, tangibly storing processor-executable instructions to:

uniquely identify a web browser window, where an event occurred, with a window locator;

uniquely identify at least one document with a document locator, the document locator derived from information describing a document path from the web browser window to the at least one document, the at least one document being within the web browser window, the document path being in a hierarchical structure that includes the at least one document and the web browser window;

create a communicable virtual stack storing at least one transfer data structure each containing the window locator and the document locator; and communicate the virtual stack and the transfer data structure(s) stored therein to at least one other collaboration computer having at least one different platform, operating system or web browser through at least one network connection via a collaboration server or a peer-to-peer communication over a Distributed Internet Services system that comprises one or more networks connected to one or more Enterprise Information System (EIS) tiers, one or more component server tiers, and one or more target/client tiers, thereby enabling a collaboration session therewith.

32. A computer system comprising:

two or more client computers, each of the two or more client computers including at least one memory, at least one central processing unit and at least one network connection;

one or more networks connected to each of the two or more client computers through the respective at least one network connection;

a collaboration process executing on the two or more client computers, the collaboration process comprising the steps of:

uniquely identifying a web browser window, where an event occurred, with a window locator;

uniquely identifying at least one document with a document locator, the document locator derived from information describing a document path from the web browser window to the at least one document, the at least one document being within the web browser window, the document path being in a hierarchical structure that includes the at least one document and the web browser window; and creating a communicable virtual stack storing at least one transfer data structure on one client computer, the transfer data structure(s) each containing the window locator and the document locator; and communicating the virtual stack and the transfer data structure(s) stored therein to at least one other collaboration computer having at least one a different platform, operating system or web browser through at least one network connection via a collaboration server or a peer-to-peer communication over a Distributed Internet Services system that comprises one or more networks connected to one or more Enterprise Information System (EIS) tiers, one or more component server tiers, and one or more target/client tiers, thereby enabling a collaboration session therewith.

33. The system of claim 32, further comprising:

at least one network server connected to the network, the virtual stack being communicated from the at least one other client through the at least one network server to at least one other client during the collaboration session.

34. A collaboration computer system that collaborates with at least another collaboration computer system by executing collaboration steps to:

receive over a Distributed Internet Services system a communicable virtual stack storing one or more transfer data structures, each transfer data structure containing a window locator and a document locator;

use the window locator to uniquely identify a web browser, where an event occurred;

use the document locator to uniquely identify at least one document, the document locator derived from information describing a document path from the web browser window to the at least one document, the at least one document being within the web browser window, the document path being a path in a hierarchical structure that includes that least one document and the web browser window; and communicate the virtual stack and the transfer data structure(s) stored therein to at least one other collaboration computer having at least one of a different platform, operating system or web browser through at least one network connection via a collaboration server or a peer-to-peer communication over a Distributed Internet Services system that comprises one or more networks connected to one or more Enterprise Information System (EIS) tiers, one or more component server tiers, and one or more target/client tiers, thereby enabling a collaboration session therewith.

35. A collaboration method comprising the steps of:

transmitting a communicable virtual stack from a collaboration computer over at least one network of a Distributed Internet Services system that comprises one or more network connected to one or more Enterprise Information Systems (EIS) tiers, one or more component server tiers, and one or more target/client tiers via a collaboration server or a peer-to-peer communication, the virtual stack storing one or more transfer data structures, each transfer data structure containing a window locator and a document locator;

receiving the virtual stack on one or more other collaboration computers having at least one of a different platform, operating system or web browser from the transmitting collaboration computer;

using the window locator to uniquely identify a web browser window where an event occurred; and using the document locator to uniquely identify at least one document, the document locator derived from information describing a document path from the web browser window to the at least one document, the at least one document being within the web browser window, the document path being a path in a hierarchical structure that includes the at least one document and the web browser window.

36. The collaboration method of claim 35 further comprising the step of:

storing at least one Transfer Data Structures (TOS) in the virtual stack.

37. The collaboration method of claim 36, further comprising the step of:

storing the virtual stack.

38. The collaboration method of claim 35 further comprising the steps of:

receiving the stored virtual stack sent over one or more networks; and restructuring the stored virtual stack to form a restructured virtual stack.

39. The collaboration method of claim 38, further comprising the step of:

modifying the restructured virtual stack.

40. The collaboration method of claim 39, wherein the restructured virtual stack is modified asynchronously with a creation of another virtual stack.

* * * * *